(12) United States Patent
Kawakami et al.

(10) Patent No.: US 12,437,495 B1
(45) Date of Patent: Oct. 7, 2025

(54) CONTENT ITEM DISPLAY METHOD AND COMPUTER-READABLE MEDIUM

(71) Applicant: CELSYS, Inc., Tokyo (JP)

(72) Inventors: Yosuke Kawakami, Tokyo (JP); Taiki Maruya, Tokyo (JP); Takeshi Sasame, Tokyo (JP)

(73) Assignee: CELSYS, Inc., Tokyo (JP)

( * ) Notice: Subject to any disclaimer, the term of this patent is extended or adjusted under 35 U.S.C. 154(b) by 0 days.

(21) Appl. No.: 19/229,322

(22) Filed: Jun. 5, 2025

Related U.S. Application Data

(63) Continuation of application No. PCT/JP2023/042802, filed on Nov. 29, 2023.

(30) Foreign Application Priority Data

Dec. 6, 2022 (JP) .................................. 2022-194896

(51) Int. Cl.
*G06T 19/20* (2011.01)
*G06F 3/14* (2006.01)

(52) U.S. Cl.
CPC ................ *G06T 19/20* (2013.01); *G06F 3/14* (2013.01); *G06T 2219/2004* (2013.01)

(58) Field of Classification Search
None
See application file for complete search history.

(56) References Cited

U.S. PATENT DOCUMENTS

| 6,243,093 B1 | 6/2001 | Czerwinski et al. |
| 10,768,421 B1 | 9/2020 | Rosenberg et al. |
| 11,908,094 B2 * | 2/2024 | Block .................... G06T 19/20 |

(Continued)

FOREIGN PATENT DOCUMENTS

| CN | 111937046 A | 11/2020 |
| CN | 112181131 A | 1/2021 |

(Continued)

OTHER PUBLICATIONS

"Non-fungible tokens (NFT): What are NFTs? Benefints and use," [retrieved 2025 online: https://ethereum.org/en/nft/].

(Continued)

*Primary Examiner* — Daniel F Hajnik
*Assistant Examiner* — Jed-Justin Imperial
(74) *Attorney, Agent, or Firm* — Faegre Drinker Biddle & Reath LLP

(57) ABSTRACT

Method for instructing display device to express relationship between content pieces and folders, using a virtual space and virtual camera, including: when first, second, and third objects have a hierarchical relationship between parent, child, and grandchild, arranging such objects in virtual space with a first face of the first object being adjacent to part of a second face of the second object, and part of a third face of the second object is adjacent to part of a face of the third object; when the first and fourth objects have a hierarchical relationship between parent and a child, arranging such objects in virtual space with part of the first face of the first object being adjacent to part of a face of the fourth object; instructing display device to display image of the virtual space captured by the virtual camera using an instruction of the user to the virtual camera.

20 Claims, 25 Drawing Sheets

(56) References Cited

U.S. PATENT DOCUMENTS

| | | | |
|---|---|---|---|
| 2006/0212833 A1* | 9/2006 | Gallagher | ............ G06T 11/206 715/848 |
| 2018/0089215 A1* | 3/2018 | Moon | .................. G06F 16/162 |
| 2019/0243809 A1 | 8/2019 | Shtaygrud | |
| 2020/0357188 A1 | 11/2020 | Kurabayashi | |
| 2021/0005014 A1 | 1/2021 | Hayashi | |
| 2021/0035351 A1 | 2/2021 | Hayashi | |

FOREIGN PATENT DOCUMENTS

| | | | | |
|---|---|---|---|---|
| GB | 2387754 A | * | 10/2003 | ............ G06T 19/20 |
| JP | 2003-99464 A | | 4/2003 | |
| JP | 2003-162543 A | | 6/2003 | |
| JP | 2003-173225 A | | 6/2003 | |
| JP | 2004-171456 A | | 6/2004 | |

OTHER PUBLICATIONS

International Search Report mailed Feb. 13, 2024 for corresponding PCT/JP2023/042802.

* cited by examiner

CONTENT ITEM DISPLAY METHOD AND COMPUTER-READABLE MEDIUM

CROSS REFERENCE OF RELATED APPLICATION

This application is a continuation of International Application Serial No. PCT/JP2023/042802, filed Nov. 29, 2023, which claims priority to Japanese Patent Application No. 2022-194896, filed Dec. 6, 2022. The contents of these applications are incorporated herein by reference in their entirety.

BACKGROUND

Technical Field

The present disclosure relates to a content display method and a non-transitory computer-readable medium storing a content processing program.

Background Art

There has heretofore been a technology that makes it easy for a user to manage a plurality of content pieces including images, videos, text, three-dimensional model data, audio data, and the like by placing information representing the plurality of content pieces in a virtual space and displaying this virtual space on a display device.

In the storage, retrieval, and the like of video content pieces, for example, there is a technology that provides a content management device and method, which make it possible for a browsing user who is browsing a catalog, a guidebook or the like without any particularly clear intention to browse the overview and details of the information while exploring a content exploring space as if exploring on a map, in other words, which make it possible for the user to browse the content pieces by selecting a content piece to be browsed while exploring the content exploring space represented as a content map, and to enjoy the world of video content pieces with a simple operation (see, for example, Japanese Unexamined Patent Application Publication No. 2003-162543).

There is also a technology that makes it possible to intuitively grasp the structure of a tree structure object D1 even with a small display area when displaying the tree structure object in a virtual space, by treating an object included in the tree structure object D1 as a parent object, displaying the parent object as a road, treating an object belonging to the parent object as a child object, and displaying the child object as a road branching off from the parent object road in either left or right direction (see, for example, Japanese Unexamined Patent Application Publication No. 2003-99464).

There is also a technology to manage information on arrangement coordinates of mid-level and lower-level content pieces, thereby displaying a mid-level content piece AA and the like around an upper-level content piece A and displaying a lower-level content piece AAA and the like around the mid-level content piece AA and the like, so that all the lower-level content pieces AAA and the like are displayed simultaneously on a monitor 2 (see, for example, Japanese Unexamined Patent Application Publication No. 2003-173225).

There is also a technology to change hierarchical structure display information with positional information (see, for example, Japanese Unexamined Patent Application Publication No. 2004-171456). Specifically, a hierarchical structure display information generation unit receives hierarchical structure information, and a display object management unit searches through a folder display object management database for a three-dimensional folder display object corresponding to a folder ID included in the hierarchical structure information, and searches for a three-dimensional content display object corresponding to a content ID included in the hierarchical structure information. The hierarchical structure display information generation unit generates hierarchical structure display information for three-dimensionally displaying a hierarchical structure based on the searched three-dimensional folder display object and three-dimensional content display object, receives positional information on a position specified in a two-dimensional display region in which the hierarchical structure is three-dimensionally displayed by the hierarchical structure display information, and changes the generated hierarchical structure display information with the positional information.

There is also a technology that makes it possible to trade a content piece as a unique digital work, which cannot be copied, by using a non-fungible tokens (NFT), and to use this content piece in a virtual space or the like formed on the Internet (see, for example, https://ethereum.org/en/nft/).

CITATION LIST

Patent Document

Patent Document 1: Japanese Unexamined Patent Application Publication No. 2003-162543
Patent Document 2: Japanese Unexamined Patent Application Publication No. 2003-99464
Patent Document 3: Japanese Unexamined Patent Application Publication No. 2003-173225
Patent Document 4: Japanese Unexamined Patent Application Publication No. 2004-171456

Non-Patent Document

Non-Patent Document 1: https://ethereum.org/en/nft/
Summary

Various platforms are involved in the distribution, use, and management of content, including the NFT technology. For this reason, from the user's point of view, it remains difficult to intuitively and easily manage and use a plurality of content pieces managed via various platforms. In addition, from the platform's perspective, there is redundant burden on the platform to establish its own environment for managing and providing content to the user upon providing the content.

Technology of disclosure provides a content display method for instructing a display device to express a hierarchical relationship between a plurality of content pieces and a plurality of folders, for which prepared are a virtual space in which arranged are the plurality of content pieces that may have a hierarchical relationship with each other and are possessed by a user and a plurality of objects representing each of the plurality of folders that may have the content pieces at a lower level in the hierarchical relationship, and a virtual camera that captures and generates an image of the virtual space, the method including: when a first object, a second object, and a third object have a hierarchical relationship between a parent, a child, and a grandchild, arranging the first object, the second object, and the third object in the virtual space so that a part of a first face of the first object is adjacent to a part of a second face of the second object, and a part of a third face of the second object is adjacent to a part of a face of the third object; when the first object and a fourth object have a hierarchical relationship between a parent and a child, arranging the first object and the fourth object in the virtual space so that a part of the first face of the first object is adjacent to a part of a face of the fourth object; instructing the display device to display the image of the virtual space captured by the virtual camera according to an instruction of the user to the virtual camera.

The disclosed technology makes it easy for a user to handle a plurality of content pieces interposed by a plurality of content providers.

DESCRIPTION OF EMBODIMENTS

Figure 1:
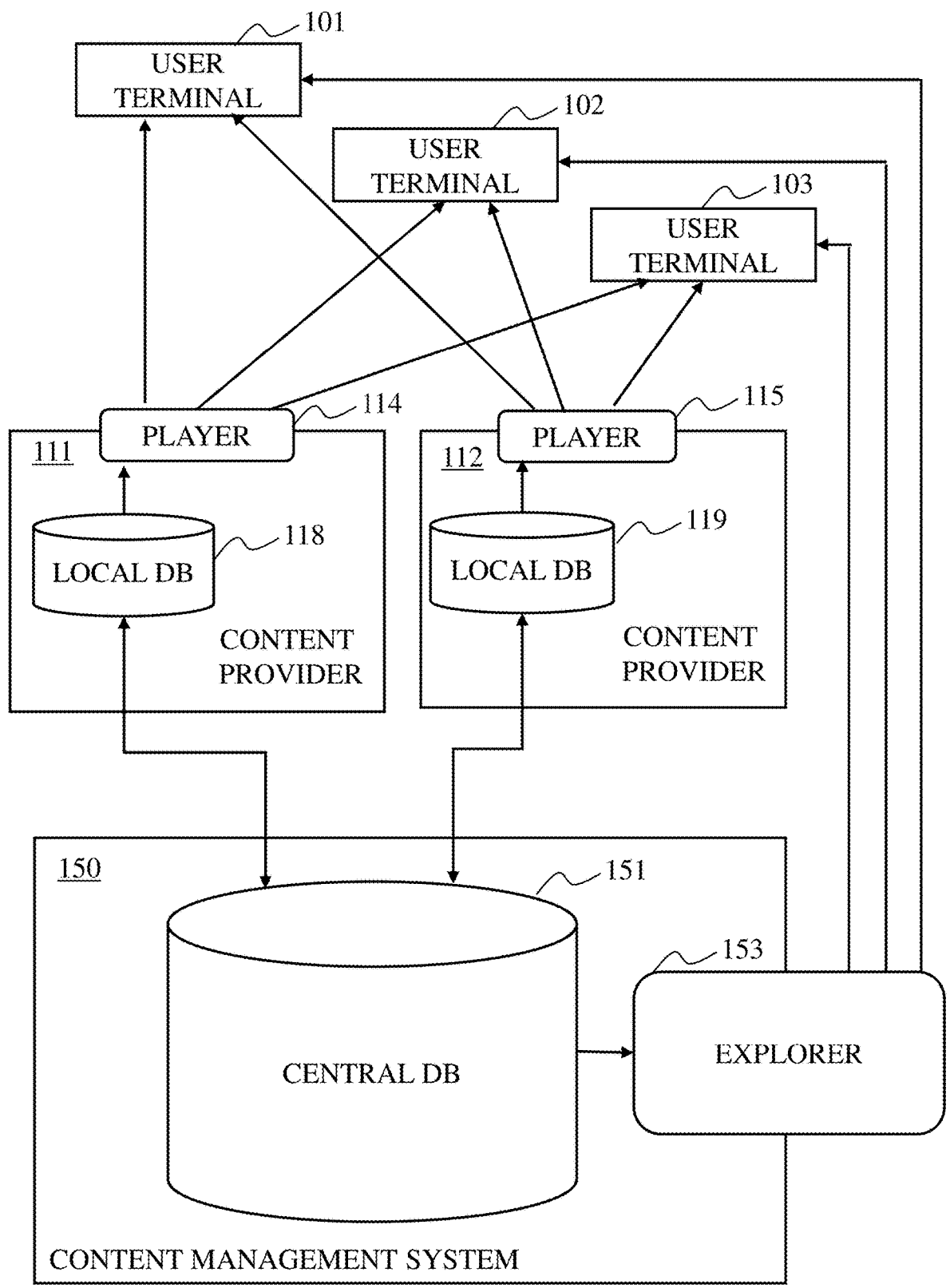
FIG. 1 is a diagram showing a relationship between a content management system, users, and content providers.

The disclosed technology will be described below with reference to the drawings.

The disclosed technology does not exclude the NFT technology. Therefore, the disclosed technology does not prevent the use of content in which the NFT technology is applied to content and index data of the content is recorded on a blockchain (tokens are created).

Note that legal terms related to intellectual property rights such as copyright and publicity rights are used in this specification and the like. It should be noted that these terms in this specification and the like are based on the premise that different terms may be used or the terms may have different meanings depending on the country that defines the intellectual property rights, and that the terms in this specification may be replaced and interpreted with the most appropriate terms as necessary.

This specification and the like specifically disclose technical aspects of embodiments that provide advantageous effects. It should also be noted that even if there is a technology that cannot be used in some cases due to restrictions such as contracts regarding the use, profits, and disposal of rights in intellectual property related to content, this does not provide a basis for claiming that the disclosed technology does not meet the enablement requirement.

The meanings of the terms used in this specification and the like are as follows.

A content piece refers to data that can be handled by a computer, including images, videos, text, three-dimensional model data, audio data, other data, or a combination thereof. The content piece includes real data and management data.

The real data refers to data included in the content piece, and is intended to be perceived by a user who has the right to use the content piece. The real data refers to either the real data itself or data of a link to a location where the real data itself is stored. Note that the disclosed embodiments should be implemented by considering the robustness of the real data, whether to store the real data itself, whether to refer to linked data, how to select a link destination, and the like. A link location is, for example, an area of memory or a location on the Internet (URL or URI).

Editing the content piece refers to making reversible changes to the real data included in the content piece. For example, it means that information on changes to the real data is stored, and it is guaranteed that the edited content piece can be restored to the state before editing. Specifically, it is desirable to store editing information without rewriting the real data. When a player reproduces the content piece, the user is made to perceive the edited state of the content piece, and an output is provided to the user as if the editing information were added to the real data. The editing information may be an editing history including the time of editing. If the editing history is saved, the state of the edited content piece at a desired time in the past can be acquired. The editing history may include information on a possessor of the content piece (that is, an editor) at the time of the editing.

The management data of the content piece is data included in the content piece or referenced from the content piece, and refers to data used to manage the content piece or real data, such as data that identifies the rights to the content piece or real data (rights defined by a contract, such as the right to use) and data that identifies a provider.

A master content piece is data that includes the real data of the content piece and is used to generate a content piece including a copy of the real data. It is not possible to generate copies of the content piece from the content piece. A copy of the content piece can only be generated by generating the content piece from the master content piece. The maximum number of copies that can be generated is stored in the management data of the master content piece. The content provider or the user can be the possessor of the master content piece. The master content piece includes real data and management data.

The management data of the master content piece is data that is included in the master content piece or referenced from the master content piece. The management data of the master content piece refers to data that includes information on the number of copies that can be made of the content piece, as well as the same information as the management data of the content piece, and manages the act of copying the content piece.

The provider refers to a platform that provides a content piece to the user or mediates content distribution between users. The provider also provides the master content piece.

"Possessing the content piece" generally means having the right to use the content piece. The rights possessed by the user for each content piece can be interpreted in various ways, such as the right to use the content piece, the right to resell the content piece, and the right to adapt the content piece. The details of the rights are determined based on terms and conditions of the content provider or individual contracts regarding the content piece. Therefore, it should be noted that "possessing the content piece" varies depending on the details of the contract regarding each content piece.

Embodiment 1

FIG. 1 is a diagram showing a relationship between a content management system, users, and content providers.

A content management system 150 includes a central DB 151 and an explorer 153.

The content management system 150 is connected to a user terminal 101, a user terminal 102, and a user terminal 103 via the explorer 153. All or part of a program that realizes the explorer 153 may be in the user terminal 101, the user terminal 102, the user terminal 103 or another computer.

The explorer 153 is configured to place a hierarchical relationship between content pieces stored in the central DB 151 in a virtual space, and to provide an image captured by a virtual camera in the virtual space to a user that uses the user terminal 101, for example. In this hierarchical relationship, a folder may exist that contains a content piece at a lower level in the hierarchical relationship.

Specifically, the explorer 153 operates so that the user can perceive, through the image, the hierarchical relationship between the content pieces and folders as a three-dimensional positional relationship between a plurality of three-dimensional objects in the virtual space.

The content provider 111 includes a local DB 118 and a player 114. The content provider 112 includes a local DB 119 and a player 115. All or part of a program that realizes the player 114 may be in the content provider 111, or may be in the user terminal 101, the user terminal 102, the user terminal 103, the content management system 150 or another computer.

The local DB 118 stores content pieces provided to the users or distributed among the users by the content provider 111. The local DB 118 also stores master content pieces provided by the content provider 111.

The player 114 instructs the user terminal 101, the user terminal 102 or the user terminal 103 to convert the real data of the content piece in the local DB 118 into information that can be perceived by the user and present it to the user.

The content piece stored in the local DB 118 is also stored in the central DB 151.

A local DB 119 and a player 115 of a content provider 112 also have the same functions as those of the local DB 118 and the player 114, respectively, so description thereof will be omitted. The location of a program that realizes the player 115 is also the same as that of the program that realizes the player 114.

The functions of the content management system will be described below.

It is assumed, for example, that a user A (not shown) is logged in to the content management system 150 via the user terminal 101.

The explorer 153 searches through the central DB 151 for a content piece that can be used (possessed) by the user A, and instructs the user terminal 101 to display the content piece in a virtual three-dimensional space. The content piece possessed by the user A is a content piece provided by either the content provider 111 or the content provider 112.

Note that this does not prevent the content management system from providing a function for the user A to place a content piece provided by a provider other than the content provider 111 and the content provider 112 in this virtual three-dimensional space.

Figure 2:
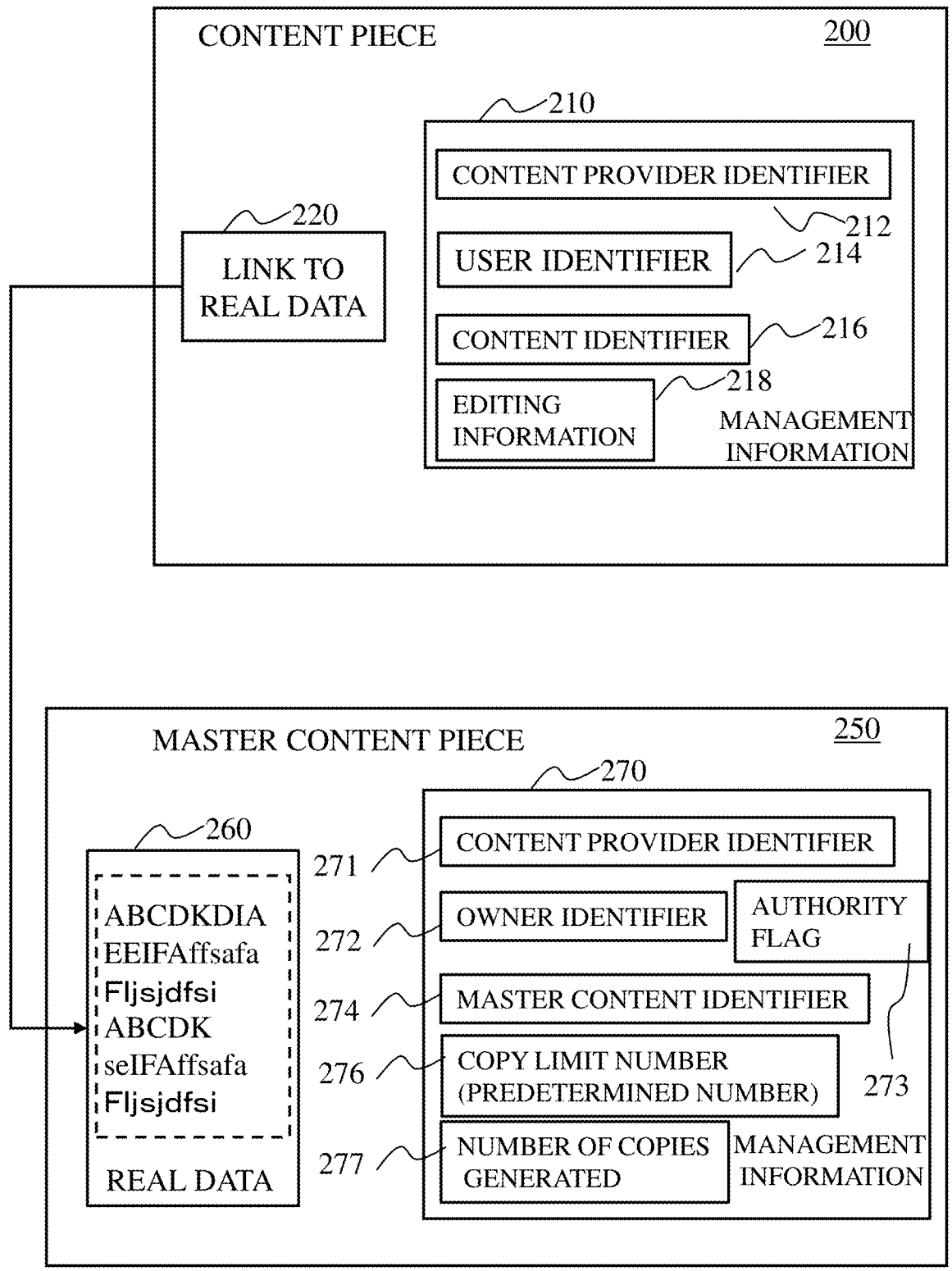
FIG. 2 is a diagram showing a content piece 200 and a master content piece 250.

FIG. 2 is a diagram showing a content piece 200 and a master content piece 250.

The content piece 200 includes management information 210 and a link 220 to real data.

The link 220 to real data 260 is information indicating a storage area in which the real data is actually stored. A link destination may be an address of a memory in which the real data is stored, an Internet address or the like. Note that the content piece 200 may include the real data itself, rather than the link to the real data. FIG. 2 shows the link to the real data 260 included in the master content piece 250. The data amount of the content piece 200 can be reduced by including the link to the real data 260 of the master content piece in the content piece 200, instead of including the real data itself in the content piece 200.

The management information 210 may include a content provider identifier 212 for identifying a content provider that provided a content piece, a user identifier 214 for identifying the user that possesses the content piece, a content identifier 216 for identifying the content piece itself, and editing information 218 that is information on editing of the content piece. The management information 210 may also include other information for managing the content piece 200.

All or part of the management information 210 may have a link to another storage location.

It is preferable that sufficient security is ensured for the storage of the real data 260 stored in the link destination of the link 220 to the real data, so that the real data 260 is not tampered with or replaced with other information. The management information 210 and/or management information 270 may also include a hash value of the real data. By storing the hash value of the real data in the management information 210 and/or the management information 270, tampering with the real data or replacement of the real data can be detected. When tampering with the real data or replacement of the real data is detected, it is preferable to take measures to recover the real data (for example, to safely back up the real data).

The master content piece 250 includes the real data 260 and the management information 270.

The real data 260 is used to generate a content piece from the master content piece or to reproduce the content piece.

The real data 260 may have the real data itself or have a link to the real data.

The management information 270 may include a content provider identifier 271 for identifying a content provider that provided the master content piece 250, an owner identifier 272 for identifying a possessor of the master content piece 250, an authority flag 273, a master content identifier 274 for identifying the master content piece 250, a copy limit number 276, and the number of copies generated 277. The authority flag 273 is information indicating whether the possessor of the master content piece 250 can change the copy limit number 276. The copy limit number 276 is an example of a predetermined number.

All or part of the management information 270 may have a link to another storage location.

The master content piece 250 can generate content pieces having links to the same real data, the number of which is set by the copy limit number, based on an instruction from the possessor of the master content piece 250.

It is preferable that each of the generated content pieces has a unique content identifier 216 as the management information. Each of the generated content pieces can thus be identified, and the transfer of the right to use the content piece can be realized. When the right to use is transferred, the user identifier 214 is changed to the identifier of the user to whom the right to use the content piece is transferred. The term "the right to use" is used in the above description, but the right to use is just an example. There are various rights related to the real data of the content piece. For example, there are various types of rights to use, such as the right to use the real data privately and the right to use the real data commercially.

The copy limit number may be a number that allows a sublicense of the right to use to be given, rather than the right to copy the real data.

When a content piece X is transferred from the user A to a user B, a possessory right that the user A had for the content piece X is extinguished. Therefore, if a specific content of the possessory right is the right to use the content piece, the user A will not be able to use the content piece X.

In other words, the content piece A will be extinguished from the virtual space in which the plurality of content pieces possessed by the user A are placed.

The possessory right of the content piece X is thus transferred to the user B. The mechanism of this embodiment makes it possible to realize the uniqueness of the content piece in the virtual space.

As described above, as for the rights related to the content piece 200, the right to copy and the right to grant a sublicense are not given to the possessor of the content piece 200. As for the rights related to the master content piece 250, the right to copy and the right to grant a sublicense are given to the possessor of the master content piece 250. The specific rights that are subject thereto may be determined according to the terms and conditions established by the provider. Alternatively, the specific rights may be determined according to individual contracts for the real data.

In order to clarify the rights to be given to the possessor of the content piece, the management information 210 or the management information 270 may include the details of the rights given to the real data.

The management information 210 and the management information 270 may be partially replaced by information included in an NFT token, for example.

Figure 3:
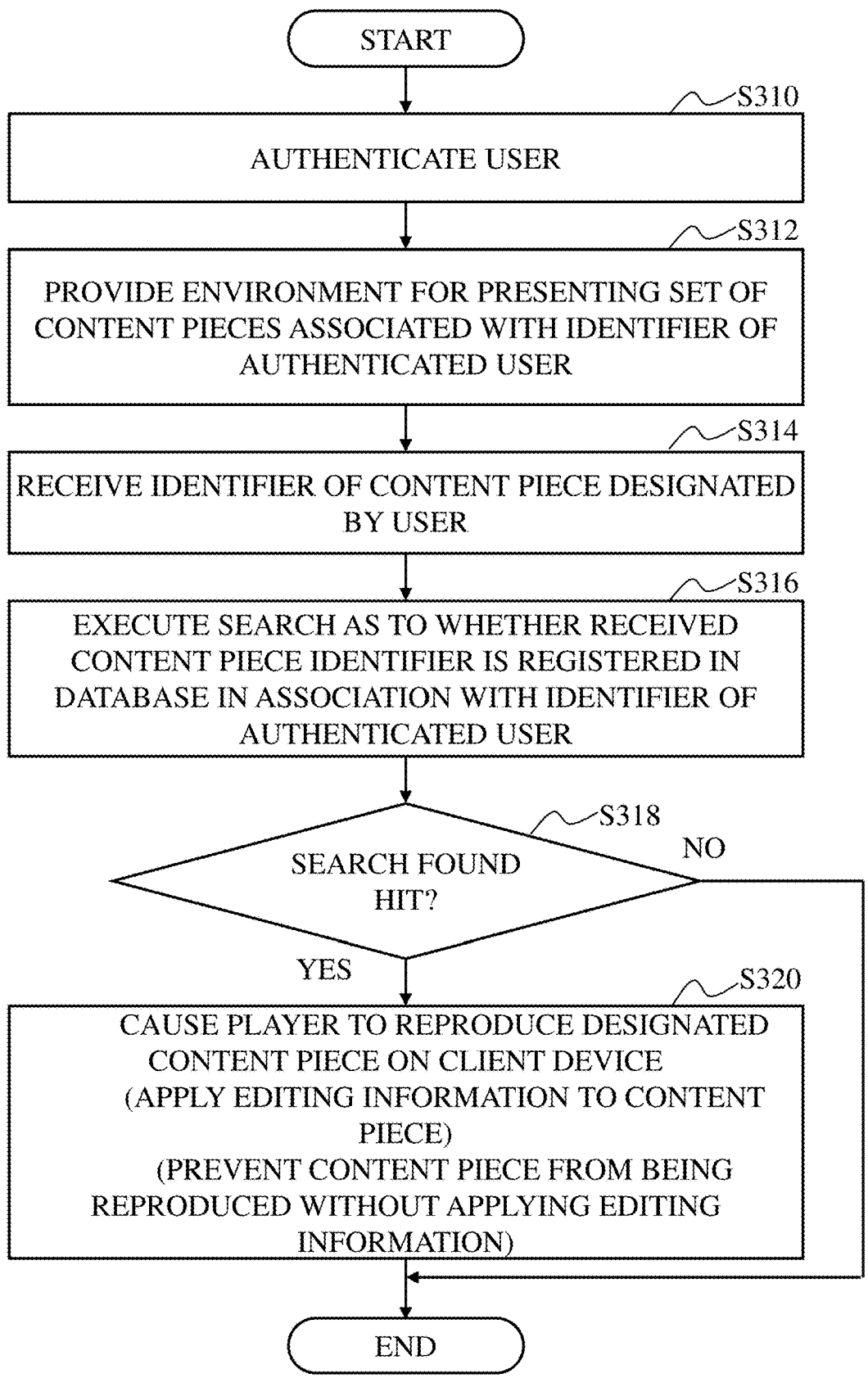
FIG. 3 is a flowchart showing operations of a content management system 150.

FIG. 3 is a flowchart showing operations of the content management system 150. The operation of each step will be described below.

The operations are assumed to be performed by the user operating the user terminal 101, for example. It should be noted that the same operations are performed via the user terminal 102 or the user terminal 103 in a case of the user operating the user terminal 102 or the user terminal 103.

[Step S310] The user is authenticated via the user terminal 101. For user authentication, various authentication functions can be used, such as authentication by user ID and password and biometric authentication.

[Step S312] The content management system 150 provides an environment in which a set of content pieces associated with the identifier of the authenticated user is presented to the user terminal 101.

The set of content pieces has a hierarchical relationship that may include folders. As described above, the hierarchical relationship is presented to the user via the user terminal 101 in the form of an image of an object captured by a virtual camera in a three-dimensional space. It is preferable that the object is represented by a three-dimensional virtual object corresponding to each of the content pieces and folders as elements of the set of content pieces.

The authenticated user may be able to make the image available to other users via another terminal (for example, the user terminal 102 or the user terminal 103).

The hierarchical relationship may be arranged in the virtual space in such a way that the user can understand the content hierarchical relationship by roughly guessing the details of the real data of the content by thumbnail images of the content, a rendering image of a simplified three-dimensional model, or the name of the content piece or the like, so that the content hierarchical relationship can be understood.

[Step S314] The content management system 150 receives an identifier of a content piece designated by the user. An instruction from the user to specify an object included in the image is received via the user terminal 101, and thus an identifier of a content piece corresponding to the specified object is received.

[Step S316] The content management system 150 executes a search as to whether the received content piece identifier is registered in the database in association with the identifier of the authenticated user.

[Step S318] It is checked if the search has found a hit. If the search result is positive (Yes), the processing proceeds to Step S320.

If the search result is negative (NO), the processing ends. In this case, the processing may be returned to any of Steps S310 to S314 until the user wants to end the processing.

[Step S320] The content management system 150 can cause the player to reproduce the designated content piece on the client device.

If an authorized user has edited the content piece, the editing information may be stored in the management information.

Instead of editing the real data itself, the editing information is recorded in the editing information 218 of the management information 210. This makes it possible to cancel the edited content if the user wants to cancel it.

It is preferable to apply the editing information to the content piece upon reproduction of the content piece.

It is also possible to prevent the content piece from being reproduced without applying the editing information thereto, upon reproduction of the content piece.

For example, if the content piece is a book, and the book is edited by leaving a note, marking, or the user's signature in the book, the content piece is reproduced with such editing applied (in the case of a book, the book is opened and the user is made to perceive the content written on the pages of the book).

An example of the effect of editing will be described below.

In a case where a content piece Y is edited by pasting a note or part or all of another content piece thereto, the user cannot perceive the content piece Y that has not been edited. In other words, the user always perceives the content piece Y in its edited state. The mechanism of this embodiment makes it possible to realize the uniqueness of content piece in the virtual space.

Note that the user that possesses the content piece Y at the time of viewing the content piece Y may be able to modify the editing contents. For example, there are also cases in the real world where the user wants to modify a note written in his/her own book. Since it is natural to allow the current user to modify the editing contents in the real world as well, an embodiment that adopts such an exception is also permitted.

Each object in a three-dimensional image perceived by the user is arranged so as to reflect a hierarchical relationship in which objects corresponding to the content pieces provided by the content provider 111 and objects corresponding to the content pieces provided by the content provider 112 are mixed. Therefore, the user can easily and comprehensively manage the content pieces provided by a plurality of content providers. The user can also easily view (perceive through the player) the details of the desired content piece by specifying the details thereof.

The user can also make the content piece he/she possesses available to other users in a limited manner. The degree of limitation can be based on the rights related to each content piece possessed by the user and the intention of the user according to each content.

By providing such content management, the user can freely organize and arrange the content pieces in the virtual space, making it easy to manage the content pieces. The user can also make the outline of the content pieces he/she possesses available to other users as necessary.

Figure 4:
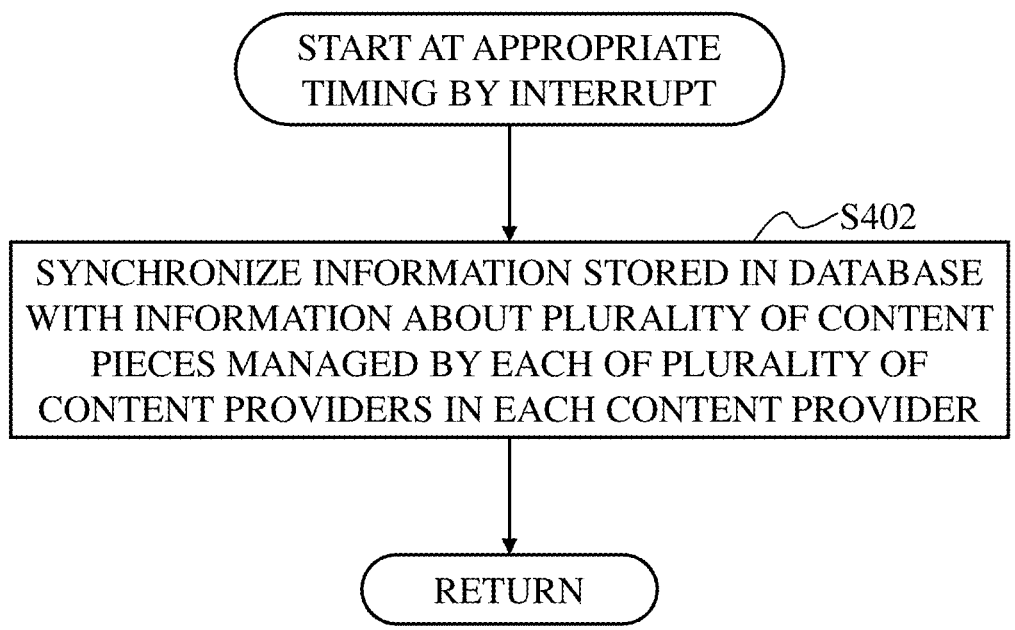
FIG. 4 is a diagram showing processing of synchronizing information between a local DB under the control of a content provider and a central DB under the control of the content management system.

FIG. 4 is a diagram showing processing of synchronizing information between the local DB under the control of the content provider and the central DB under the control of the content management system. The processing will be described in detail below.

[Step S402] The information stored in the database is synchronized with information related to a plurality of content pieces managed by each of the plurality of content providers in each of the plurality of content providers.

The central DB 151 has data synchronized with the data related to content pieces managed by the content provider 111 (or the content provider 112). This makes it possible for the content management system 150 to provide the user with a function to integrally manage various content pieces related to the plurality of content providers.

Note that the above processing is preferably executed repeatedly at appropriate timing by interrupt processing or the like so that synchronization is performed appropriately. Alternatively, the synchronization processing may be executed at the same time as updating the data.

Figure 5:
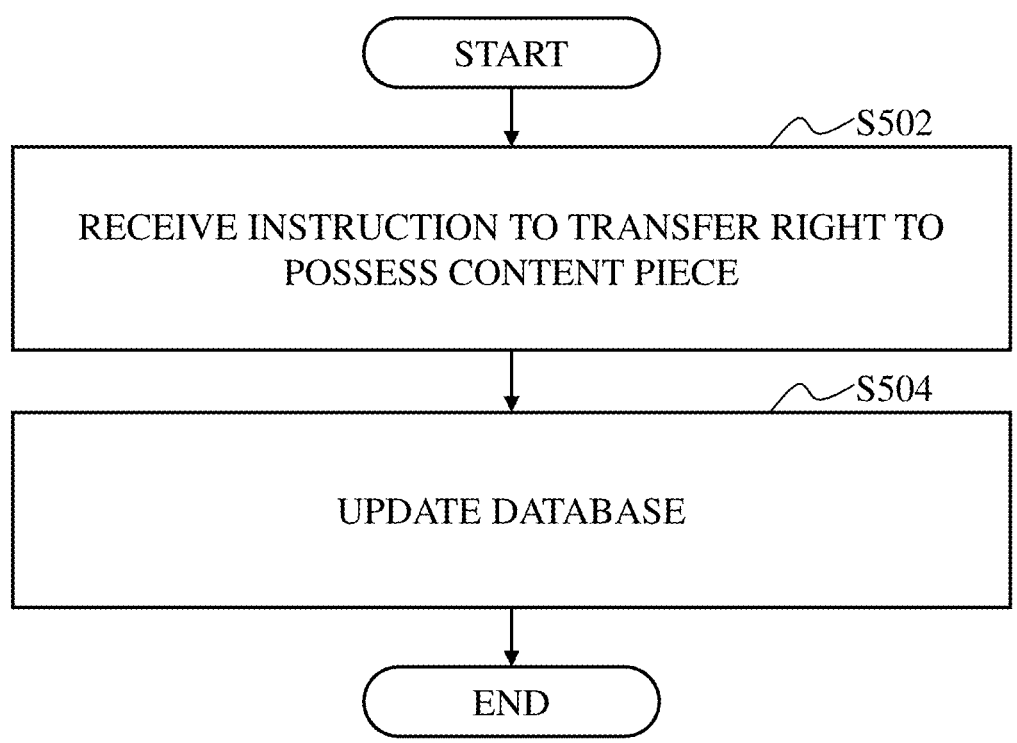
FIG. 5 is a diagram explaining processing of transferring the right to possess a content piece.

FIG. 5 is a diagram explaining processing of transferring the right to possess a content piece. Here, the term "the right to possess" refers primarily to the right to use real data included in the content piece (or linked from the content piece), but is not limited to this meaning. It should also be noted that the details of the right to use may differ depending on individual contracts, such as prohibiting commercial use as a usage form. In addition, when other users are allowed to view the real data, this is related to the right to publicly transmit a copyrighted material. It should be noted that the rights held by the content possessor to the real data included in the content piece are different. This has already been described above.

Figure 6:
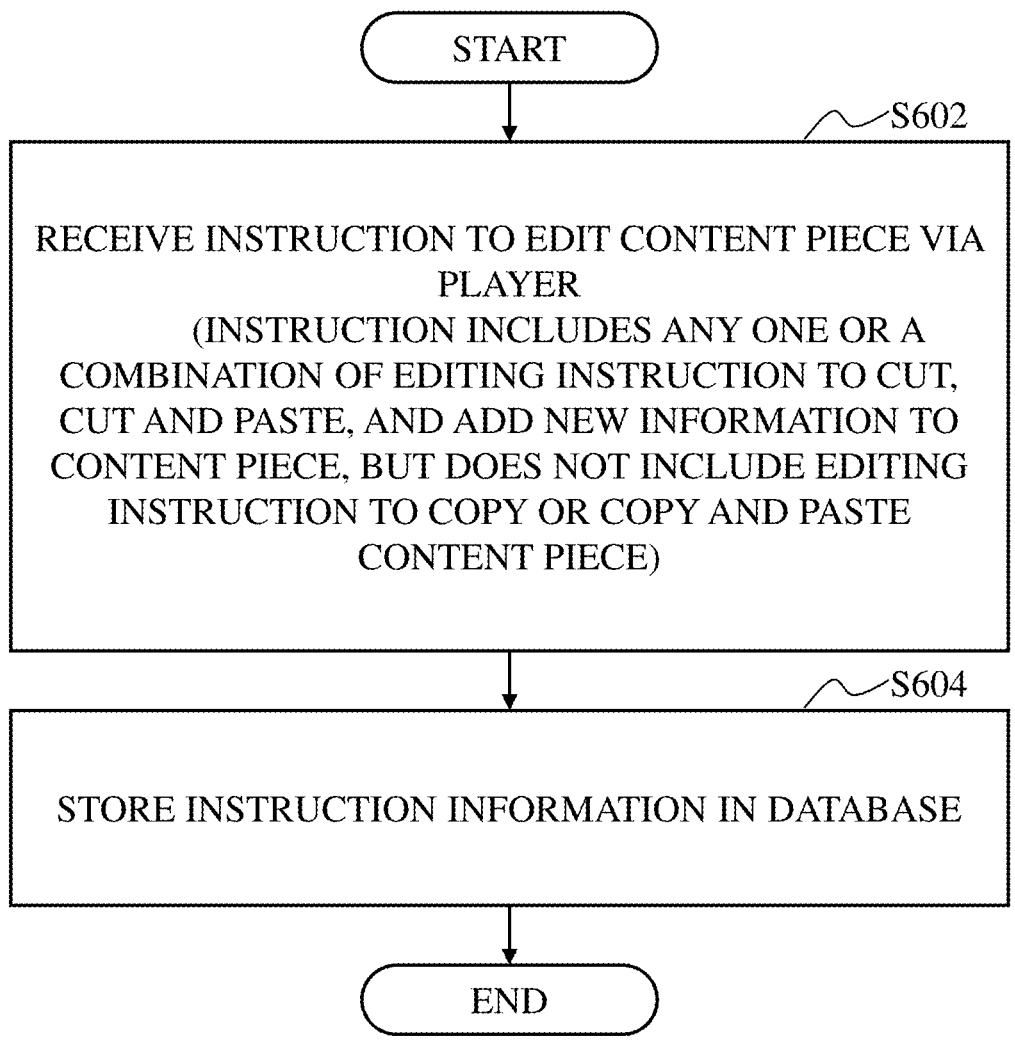
FIG. 6 is a diagram showing processing of editing a content piece.

FIG. 6 is a diagram showing processing of editing a content piece.

[Step S602] An instruction to edit a content piece is received via the player.

It is preferable that the possessor of the content piece provides a function to edit the content piece. Note that a program with an editing function different from the player that mainly executes reproduction of the content piece may be implemented. The instructions preferably include any one or a combination of editing instructions to cut, cut and paste, and add new information to the content piece, but do not include editing instructions to copy or copy and paste the content piece.

[Step S604] The instruction information is stored in the database.

The edited information may be acquired by the content management system 150 through synchronization processing between the local DB 118 (or local DB 119) of the content provider and the central DB 151.

It is preferable that content editing allows partial cutting of a content piece or pasting of a cut portion to another content piece or to another portion of the same content piece. It is also preferable that the user is allowed to perform editing to add new information to the content piece.

For example, in the real world, an article published in a newspaper can be cut out and pasted into a scrapbook. Alternatively, only the cut article can be kept at hand. In this case, the cut part of the article is separated from the newspaper. It is possible for the user to perform such real-world operations on a content piece.

Specifically, description is given below of an example where a part of the content piece A is cut and pasted onto the content piece B.

In this case, the cut part disappears from the content piece A.

Unless the pasting onto the content piece B is undone (that is, unless the part of the content piece A is not cut from the content piece B), the cutting of the content piece A cannot be undone (that is, the part of the content piece A cannot be returned to its original location in the content piece A).

The above example also applies to cut-and-paste within the same content piece.

Alternatively, in the real world, certain characters in a book are highlighted, or a note is left in a certain page. In order to perform tasks similar to those in the real world, it is possible to allow the user to edit the content piece by adding new information.

It is also preferable not to include editing instructions to copy or copy and paste the real data.

It is preferable that the function to copy the content piece is provided in the master content piece. This makes it possible to prevent the content piece from being copied against the intention of the creator of the real data of the content piece or a person with the authority to restrict the copying of the real data.

Figure 7:
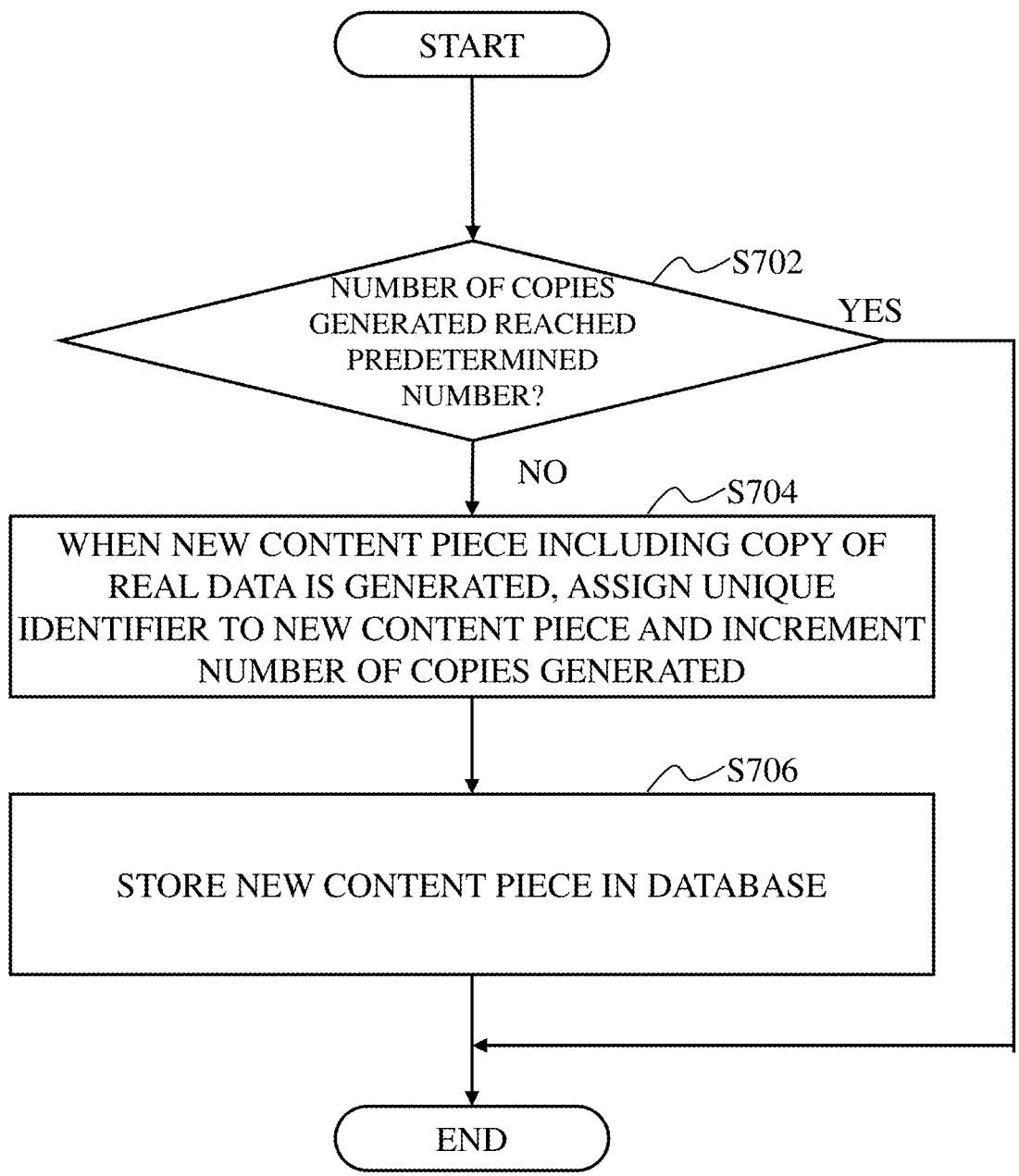
FIG. 7 is a diagram explaining processing of the master content piece.

FIG. 7 is a diagram explaining processing of the master content piece. The processing flow will be described below.

[Step S702] It is checked if the number of copies generated has reached a predetermined number.

The management information of the master content piece stores a copy limit number (predetermined number) for generating a content piece including a link to the real data. It is preferable that this copy limit number can be set by a person who has the legitimate authority to copy the real data, such as the person who created the real data. The copy limit number may be infinite (that, there may be a master content piece for which the number of times of copying the content piece is not limited).

Whether the number of copies generated has reached the predetermined number can be determined by saving the number of copies generated and comparing it to the predetermined number (copy limit number). Alternatively, a predetermined number may be set as an initial value of the copy limit number, and the copy limit number may be decremented each time a copy of the content piece is generated. Then, if the copy limit number becomes zero, it may be determined that the number of copies generated has reached the predetermined number.

[Step S704] When a new content piece including a copy of the real data is generated, a unique identifier is assigned to the new content piece. In order to identify the newly generated content piece, the unique identifier is stored in the management information 210 of the new content piece. Other information is also stored in the management information 210. The number of copies generated is incremented.

[Step S706] The new content piece is stored in the database. The master content piece 250 may be used by either the content provider 111 (or the content provider 112) or the content management system. Alternatively, the content provider 111 (or the content provider 112) may process the master content piece 250 to generate a new content piece. The content management system 150 may receive information about the generated new content piece during DB synchronization and store it in the central DB 151.

It is preferable that the master content piece itself is also allowed to have its possessory right transferred.

Embodiment 2

Figure 8:
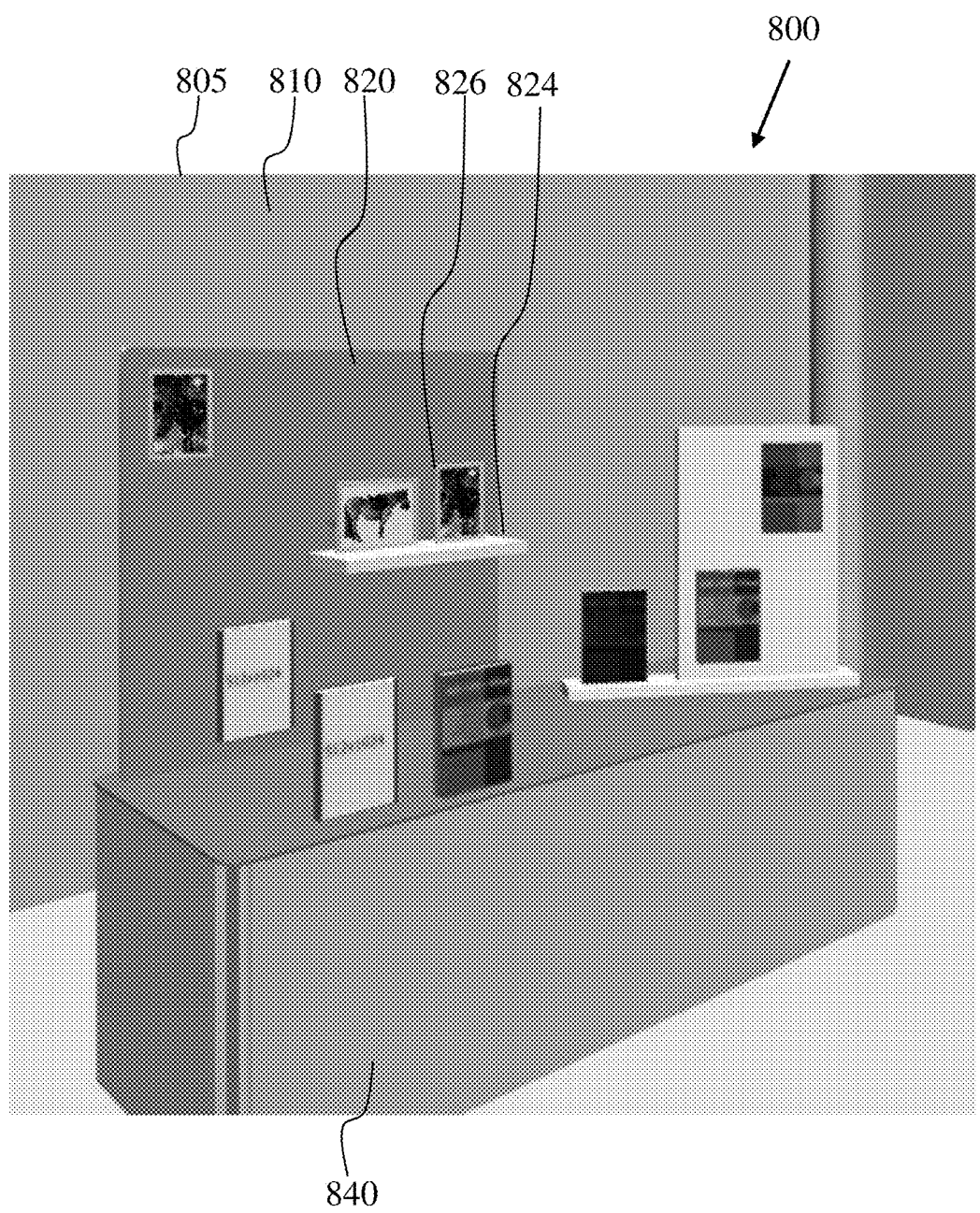
FIG. 8 is a diagram showing an image of a plurality of objects placed in a virtual space captured by a virtual camera.

FIG. 8 is a diagram showing an image of a plurality of objects placed in a virtual space captured by a virtual camera. The virtual camera is not shown.

In a virtual space 800, a plurality of objects are placed on an inner wall 810 of a virtual room 805. The virtual room 805 itself is also an object. The room 805 can be an object representing either a folder or content piece.

A wall-mounted board 820 is installed on the inner wall 810 of the virtual room 805, and a shelf 824 is installed on the wall-mounted board 820. A book 826 is placed on the shelf 824. The book 826 contains real data including text and illustrations.

Various objects are also placed on a chest 840.

The image captured by the virtual camera allows the user to recognize the positional relationship between the plurality of objects through the image. This image is realized by the function of the explorer. The explorer does not necessarily have to be configured to allow the user to view the real data itself. The main function of the explorer is to organize and place content pieces provided by a plurality of content providers in a virtual space in an integrated manner according to the user's instructions, and to allow the user to perceive the image. This makes it possible for the user to easily organize and manage the content pieces provided by the plurality of content providers by placing them in the virtual space. It is also possible to easily organize and display various content pieces in an easy-to-understand manner to other users, by showing the image of this organized three-dimensional space to those other than the user as necessary.

Figure 9A:
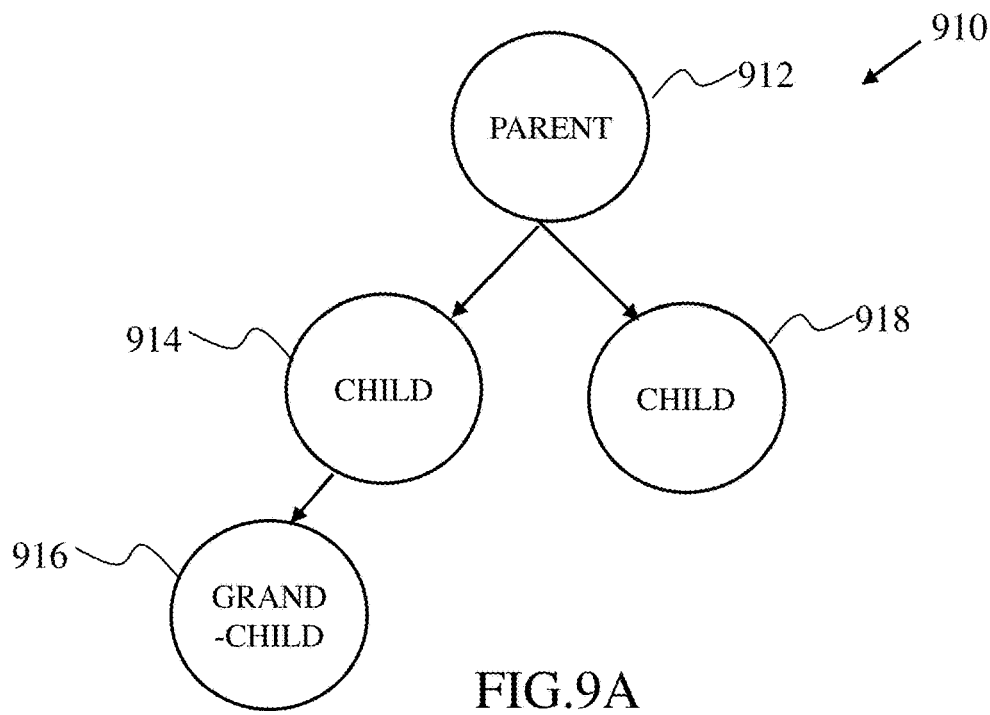
FIG. 9A is a diagram showing a hierarchical relationship between a plurality of content pieces.

FIG. 9A is a diagram showing a hierarchical relationship between a plurality of content pieces.

Figure 9B:
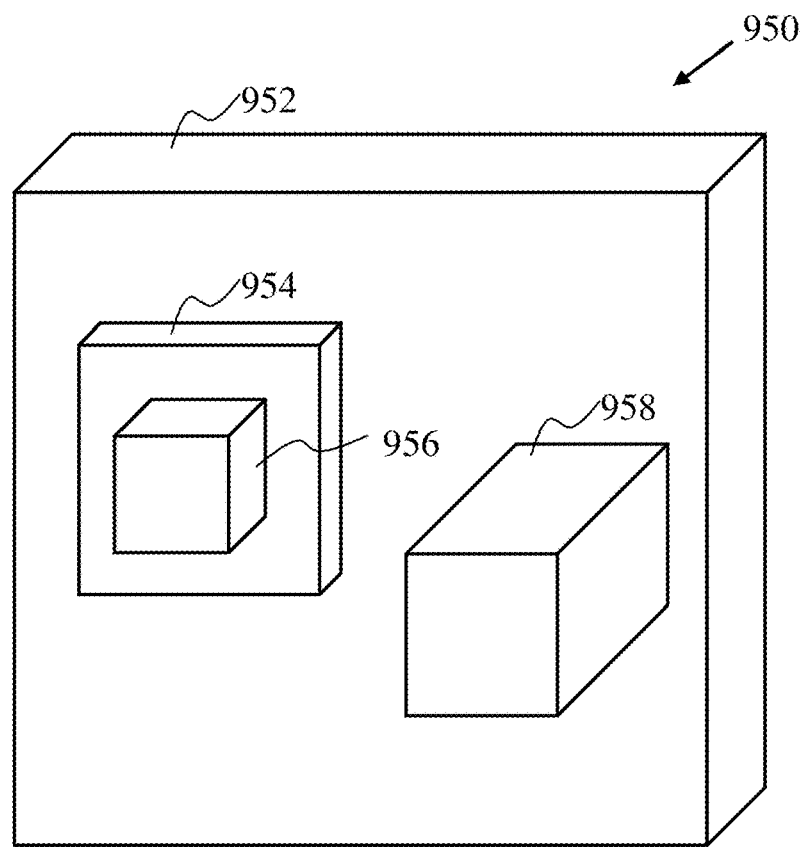
FIG. 9B is a diagram showing a state where a plurality of objects representing each of the plurality of content pieces are placed in a virtual space.

FIG. 9B is a diagram showing a state where a plurality of objects representing each of the plurality of content pieces are placed in a virtual space.

FIG. 9A shows that, according to a hierarchical relationship 910, a content piece 914 is a child of a parent content piece 912, and a content piece 916 is a grandchild. A content piece 918 is also a child of the parent content piece 912.

In FIG. 9B, an object 952, an object 954, an object 956, and an object 958 placed in a virtual space 950 represent the content piece 912, the content piece 914, the content piece 916, and the content piece 918 in FIG. 9A, respectively.

One side of the object 952 is adjacent to one side of the object 954. This adjacency relationship means that there is a hierarchical relationship between the parent and the child. In the hierarchical relationship, which is the parent and which is the child can be determined in advance depending on which face is adjacent to which face. Therefore, for example, since the face adjacent to the child of the object 952 is adjacent to the face adjacent to the parent of the object 954 and the face adjacent to the parent of the object 958, the parent-child hierarchical relationship is satisfied, that is, the object 952 is both the parent of the object 954 and the parent of the object 958.

It can also be seen that the face adjacent to the child of the object 954 is adjacent to the face adjacent to the parent of the object 956. This shows that the object 956 is the child of the object 954 and the grandchild of the object 952.

By forming the content hierarchical relationship as described above, the positional relationship between the objects representing the content pieces is defined. By thus presenting the conceptual relationship of the hierarchical relationship to the user using the positional relationship between the objects, the user can easily organize a plurality of content pieces and intuitively grasp the relationship between the content pieces.

Note that reproduction of which position on the face of an object is adjacent to another object can be achieved, for example, by storing the positional relationship between locations of the faces adjacent to the parent object in the management information of the child object.

Figure 10:
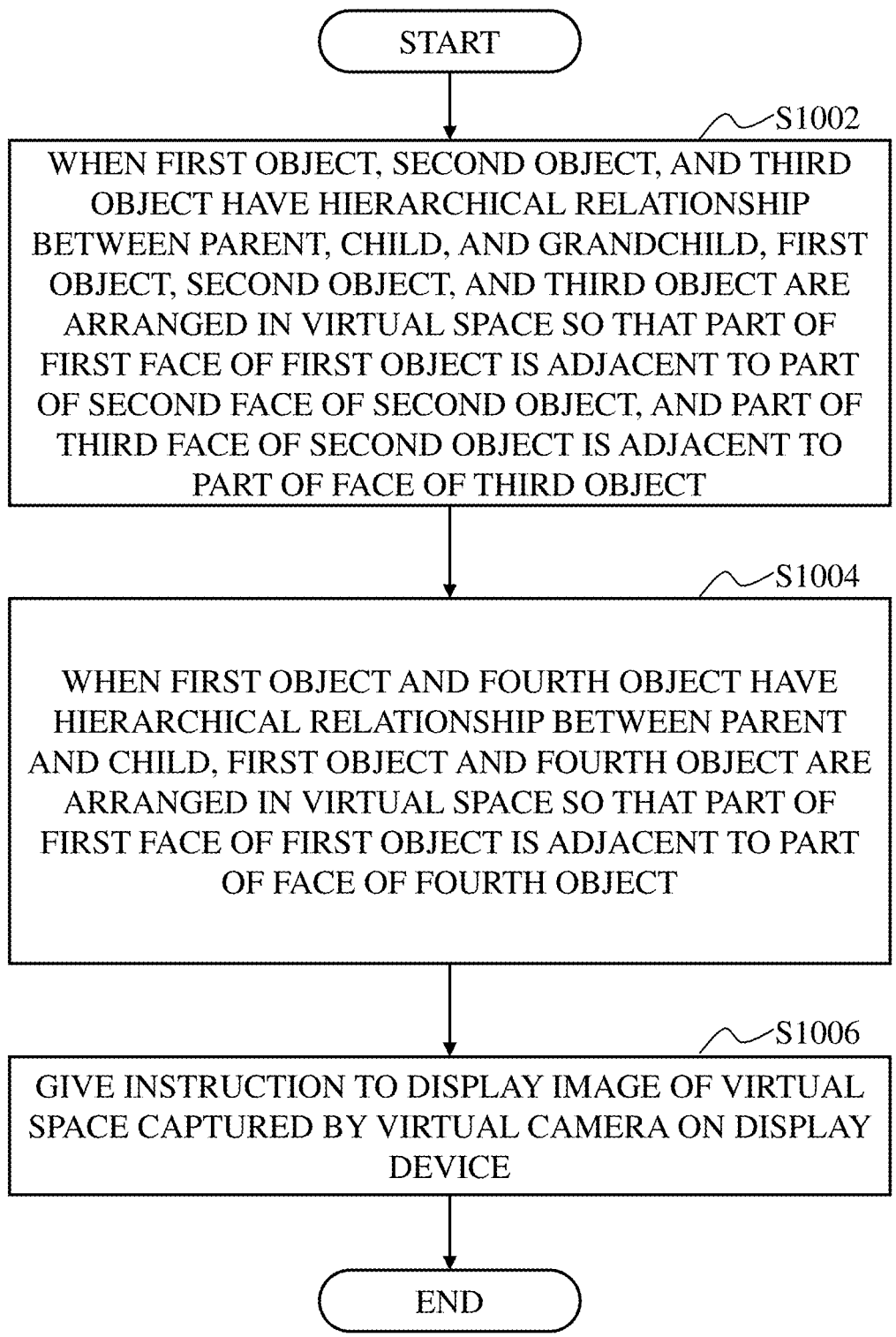
FIG. 10 is a diagram showing an example of defining a hierarchical relationship between content pieces by an adjacency relationship between objects representing the content pieces.

FIG. 10 is a diagram showing an example of defining a hierarchical relationship between content pieces by an adjacency relationship between objects representing the content pieces.

[Step S1002] When a first object, a second object, and a third object have a hierarchical relationship between a parent, a child, and a grandchild, the first object, the second object, and the third object are arranged in a virtual space so that a part of a first face of the first object is adjacent to a part of a second face of the second object, and a part of a third face of the second object is adjacent to a part of a face of the third object.

This step embodies processing of placing the objects corresponding to content pieces in the virtual space so as to indicate that the child of the parent content piece 912 is the content piece 914, and the grandchild is the content piece 916.

[Step S1004] When the first object and a fourth object have a hierarchical relationship between a parent and a child, the first object and the fourth object are arranged in the virtual space so that a part of the first face of the first object is adjacent to a part of a face of the fourth object.

This step embodies processing of placing the objects corresponding to content pieces in the virtual space so as to indicate that the child of the parent content piece 912 is the content piece 918.

[Step S1006] An instruction is given to display an image of the virtual space captured by the virtual camera on the display device.

This processing allows the positional relationship between the plurality of objects placed in the virtual space to be presented as an image to the user. This allows the user to easily visually grasp the organized information of the content pieces corresponding to each object as the hierarchical relationship.

Figure 11:
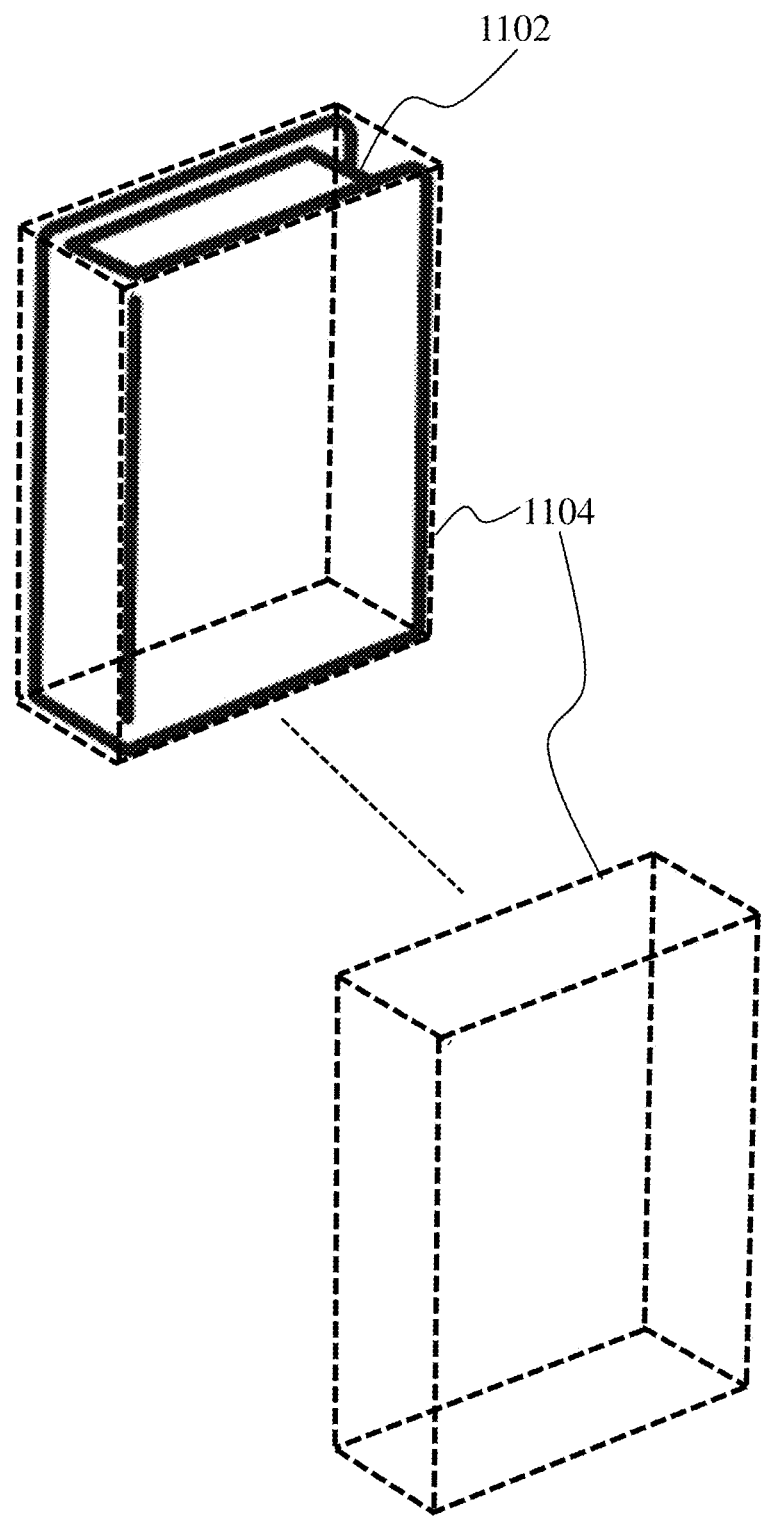
FIG. 11 is a diagram showing an example of using a plane of a solid that approximates the outer shape of an object.

FIG. 11 is a diagram showing an example of using a plane of a solid that approximates the outer shape of an object.

FIG. 11 shows an object 1102 that represents a content piece as a book. This object 1102 is a book with a cover made of thick paper that is larger than the paper inside. For such an object 1102, processing of arranging the object in a virtual space can be simplified by defining a rectangular parallelepiped 1104 that approximates the outer shape of the object, and placing other objects adjacent to each face of this rectangular parallelepiped 1104. It goes without saying that the shape of the object 1102 may also be used as is to perform the processing of arranging the object 1102 in the virtual space.

Figure 12:
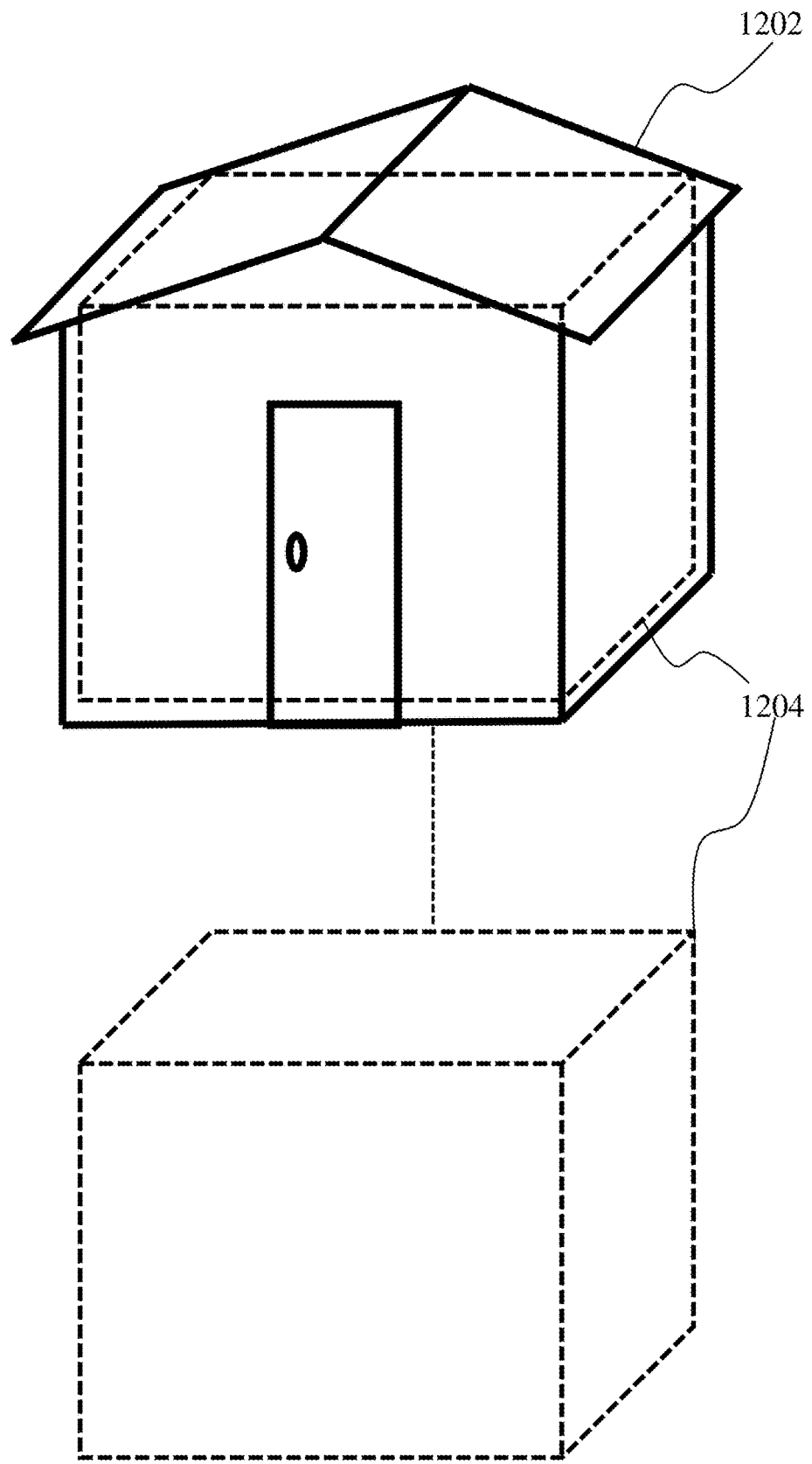
FIG. 12 is a diagram showing an example of using a plane of a solid that approximates the inner shape of an object.

FIG. 12 is a diagram showing an example of using a plane of a solid that approximates the inner shape of an object.

It is assumed that an object is arranged inside a house 1202. The inside of the house 1202 has complex faces. Therefore, processing of arranging the object in a virtual space can be simplified by defining a rectangular parallelepiped 1204 that approximates the inner shape of the house 1202 and placing other objects adjacent to each face of this rectangular parallelepiped 1204.

Figure 13A:
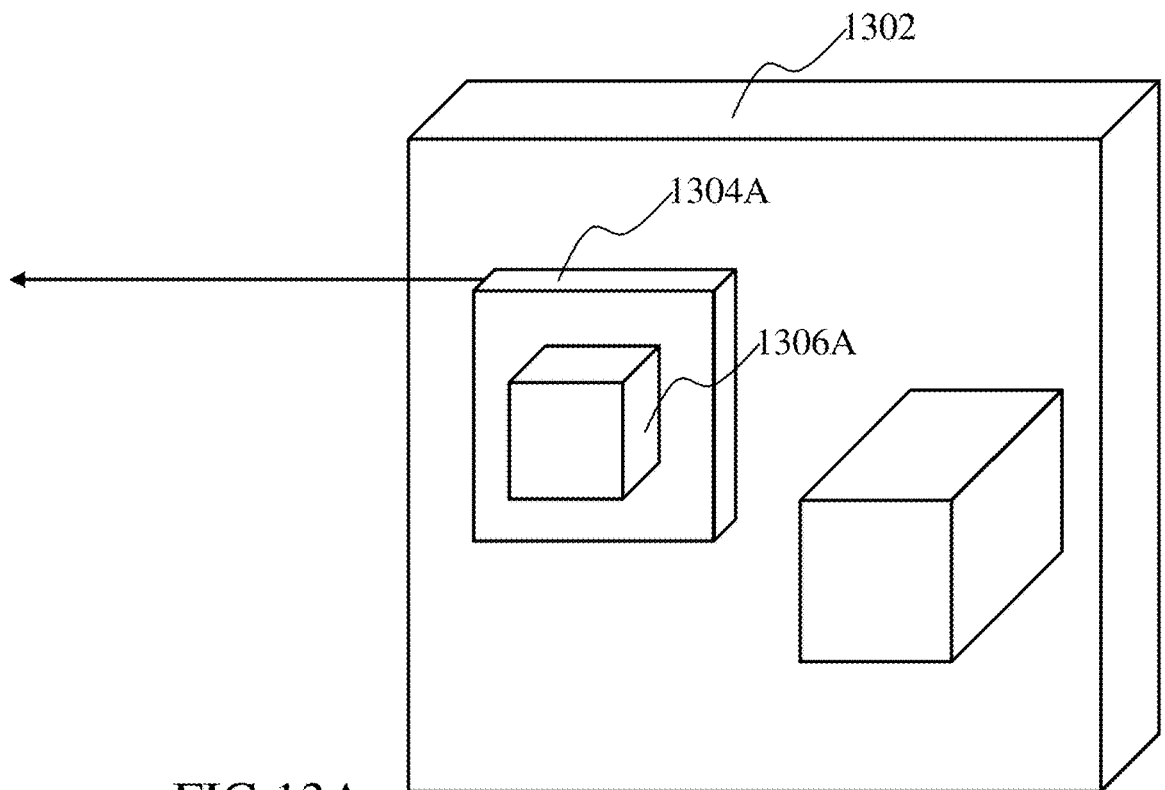
FIGS. 13A and 13B are diagrams showing processing when a certain object is moved in a virtual space.
Figure 13B:
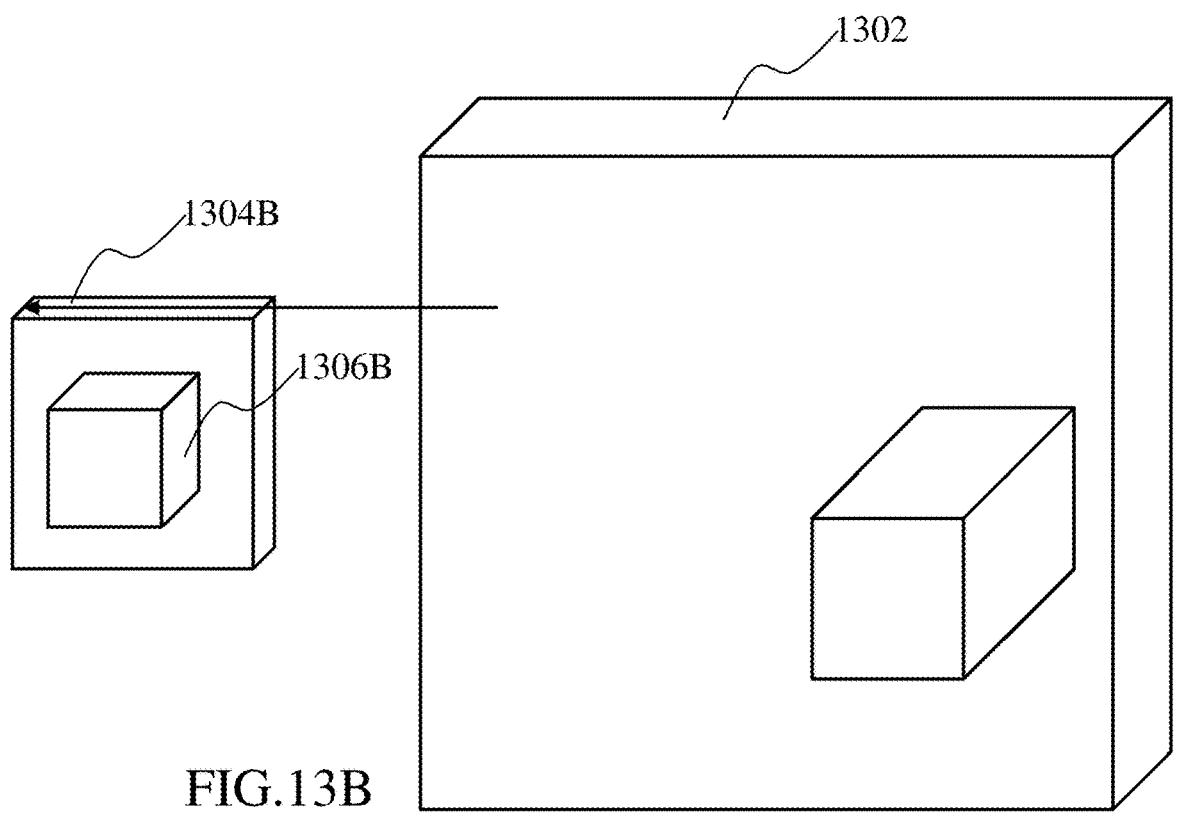

FIGS. 13A and 13B are diagrams showing processing when a certain object is moved in a virtual space.

FIG. 13A shows a state where an object 1304A adjacent to an object 1302 is to be moved horizontally (arrow direction) according to an instruction of a user.

FIG. 13B shows a state (an object 1304B) upon completion of the horizontal (arrow direction) movement of the object 1304A. A child object 1306A of the object 1304A in FIG. 13A is also moved in the arrow direction as an object 1306B as shown in FIG. 13B. When a parent object is moved as described above, it is preferable that descendant objects of the parent object are controlled to be moved together with the parent object. This makes it possible to handle them in the same way as objects in the real world, allowing the user to collectively move a plurality of objects. The hierarchical relationship between the content pieces also changes with this movement.

If only the object 1304A is to be moved, the object 1304A may be moved after moving the child object 1306A thereof so as to be adjacent to a face of the object 1302. By constructing a work environment in the virtual space that is almost the same as the work in the real world, the user can intuitively and easily move the objects, making it easier to organize the content pieces.

Figure 14:
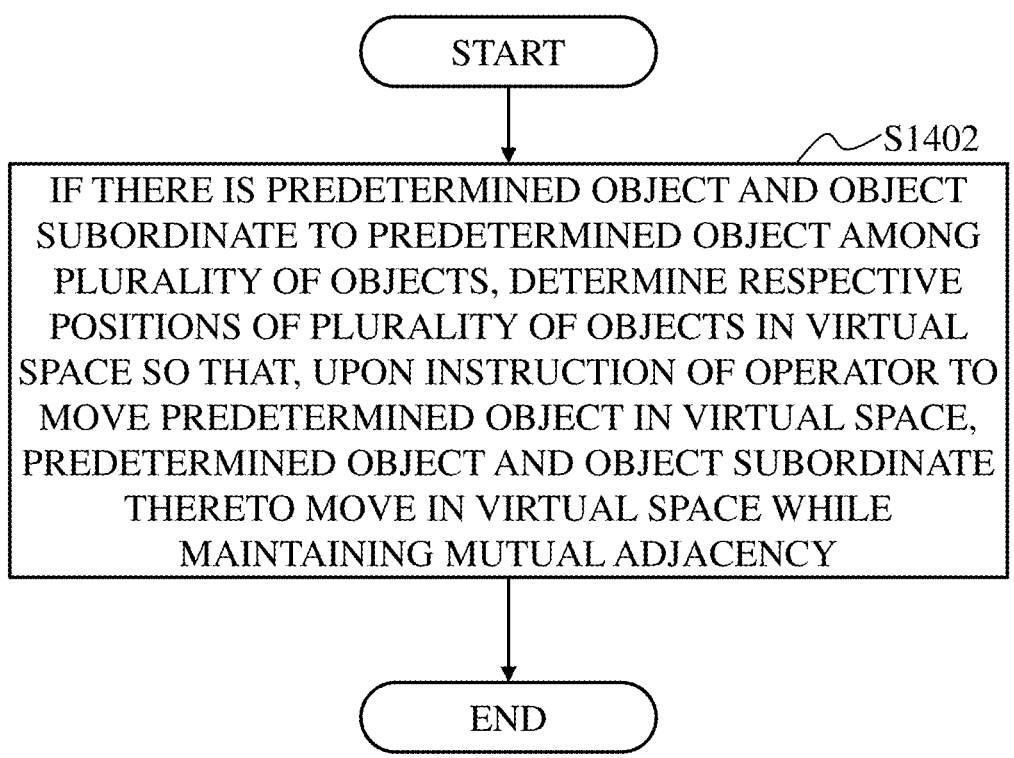
FIG. 14 is a diagram showing processing of moving a plurality of objects in a virtual space.

FIG. 14 is a diagram showing processing of moving a plurality of objects in a virtual space.

[Step S1402] If there is a predetermined object and an object subordinate to the predetermined object among a plurality of objects, respective positions of the plurality of objects in the virtual space are determined so that, upon instruction of an operator to move the predetermined object in the virtual space, the predetermined object and the object subordinate thereto move in the virtual space while maintaining their mutual adjacency.

The above step has been described in detail with reference to FIG. 13.

Figure 15A:
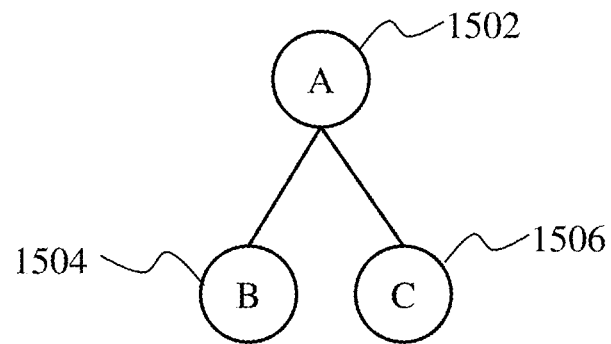
FIG. 15A is a diagram showing an example of a case where objects have a direct parent-child hierarchical relationship.

FIG. 15A is a diagram showing an example of a case where objects have a direct parent-child hierarchical relationship.

Figure 15B:
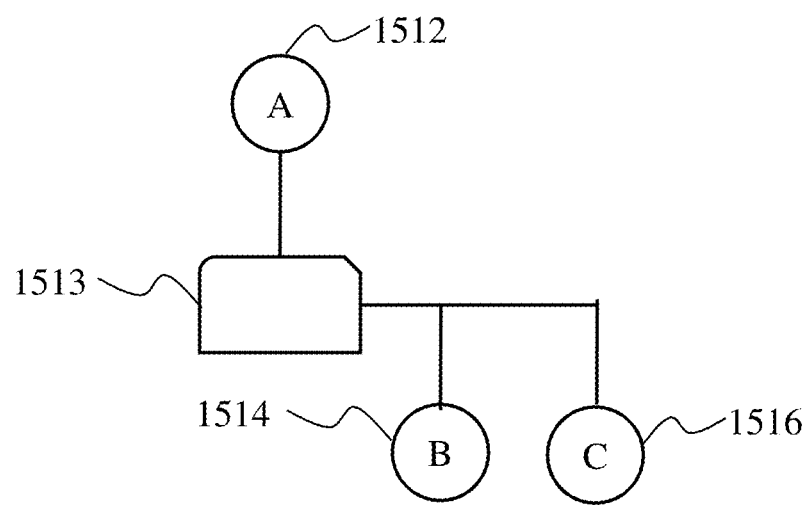
FIG. 15B is a diagram showing an example of placing a folder between objects in a parent-child relationship when a hierarchical relationship exists between the objects.

FIG. 15B is a diagram showing an example of placing a folder between objects in a parent-child relationship when a hierarchical relationship exists between the objects.

In this embodiment, both folders and content pieces are represented by objects. A folder can have any number of descendant content pieces or folders. In this embodiment, a content piece itself can also have any number of descendant content pieces or folders.

An object representing a folder is mainly represented by a tray object, a shelf object, a basket object or the like, which allows a plurality of objects to be collectively handled.

The folder object mainly has a function to display objects in a virtual space, which can be conveniently handled when the content pieces are collectively handled. However, in this embodiment, the folder object can be handled in the same way as a content object.

The content pieces are provided by content providers, and the folders may be provided mainly by the content management system. In this case, upon synchronization of the central DB 151 and the local DB 118 (or the local DB 119), the folders provided by the content management system do not need to be subject to synchronization.

A beautifully decorated tray has real data of a three-dimensional model and can be considered the same as a content piece.

As described above, the simplified configuration of this embodiment is realized by allowing the folders to be handled the same as the content pieces.

Figure 16A:
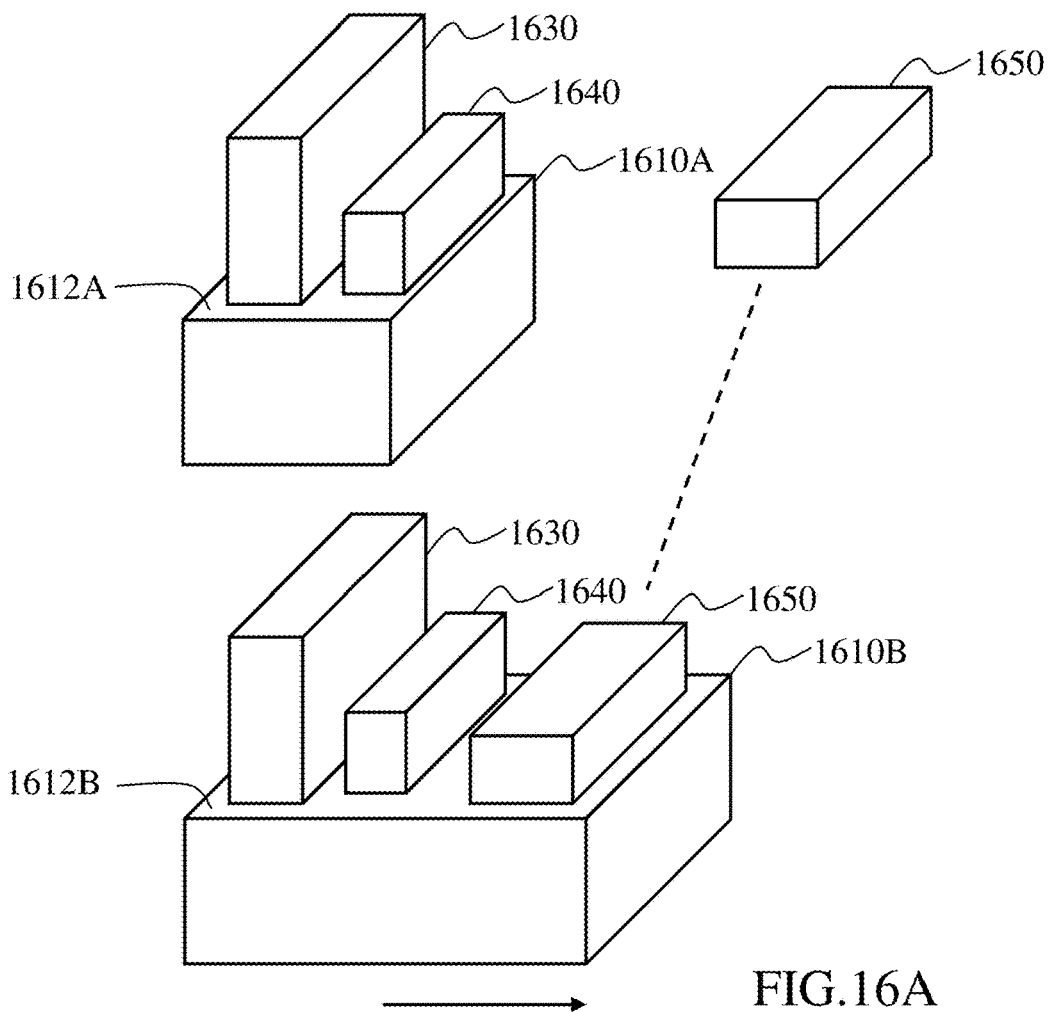
FIGS. 16A and 16B are diagrams showing an example of transforming an object in response to a change in content hierarchical relationship.
Figure 16B:
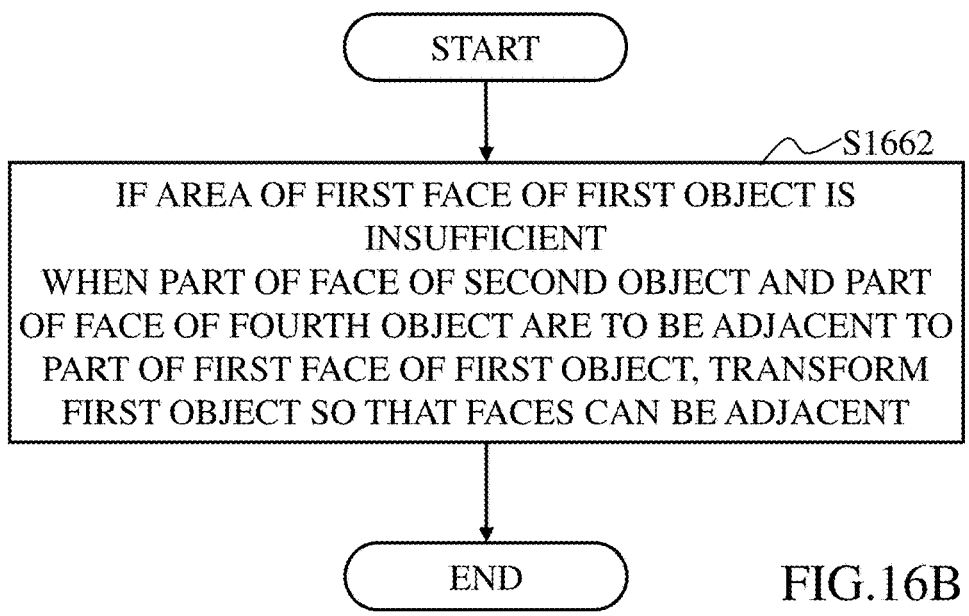

FIGS. 16A and 16B are diagrams showing an example of transforming an object in response to a change in content hierarchical relationship.

In FIG. 16A, an object 1630 and an object 1640 are adjacent on a top face 1612A of an object 1610A, expressing a hierarchical relationship. It is assumed that, in this state, the user further wants to place an object 1650 on the top face 1612A of the object 1610A. In this case, there is no more space available on the top face 1612A to place the object 1650.

Therefore, the object 1610A is expanded in the arrow direction to become an object 1610B, and the top face is extended as indicated by a top face 1612B.

This processing makes it possible to place the object 1650 on the top face 1612B of the object 1610B.

By thus transforming the object 1610A into the object 1610B, the objects can be arranged in the virtual space without causing the user to experience a feeling of strangeness even when the hierarchical relationship changes.

The processing flow of FIG. 16B will be described below.

[Step S1662] If the area of a first face of a first object is insufficient when a part of a face of a second object and a part of a face of a fourth object are to be adjacent to a part of the first face of the first object, the first object is transformed so that the faces can be adjacent.

The processing of this step is as described in FIG. 16A.

Figure 17A:
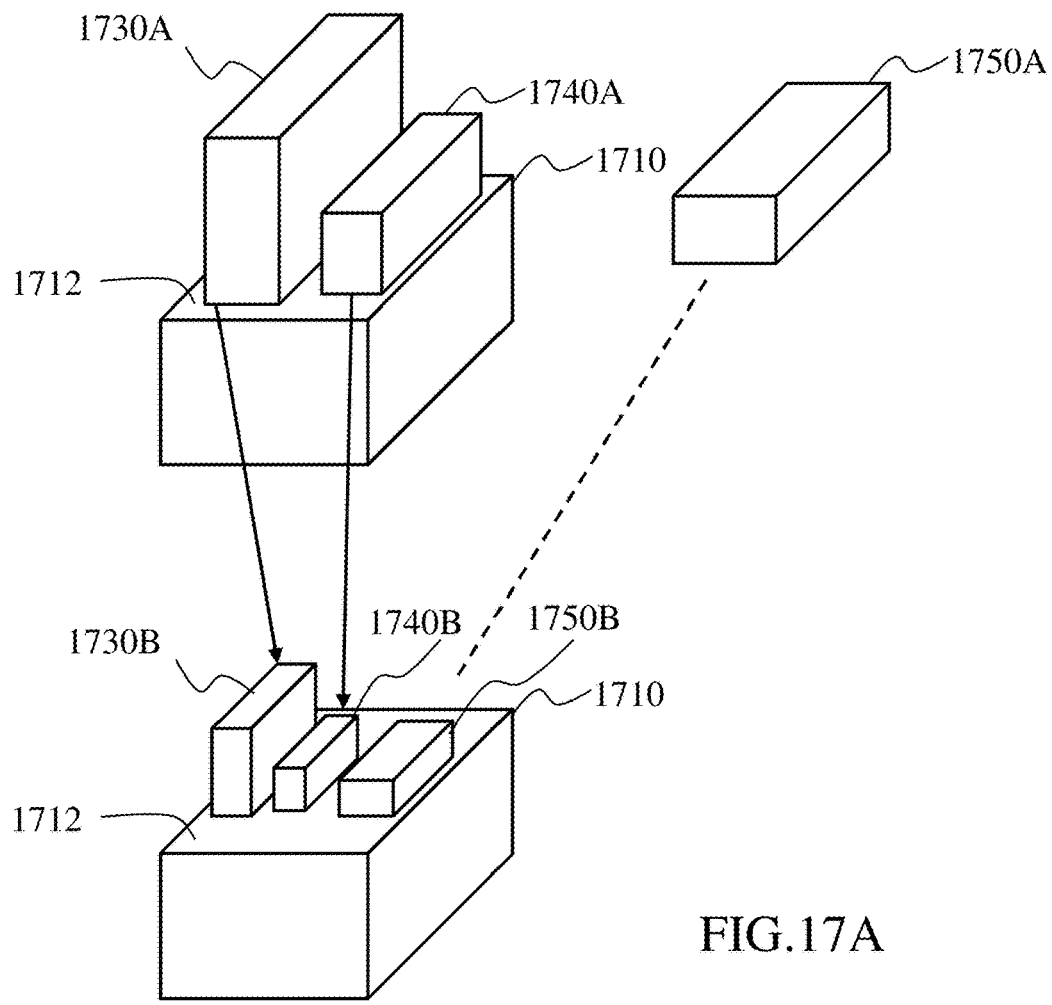
FIGS. 17A and 17B are diagrams showing another example of transforming an object in response to a change in content hierarchical relationship.
Figure 17B:
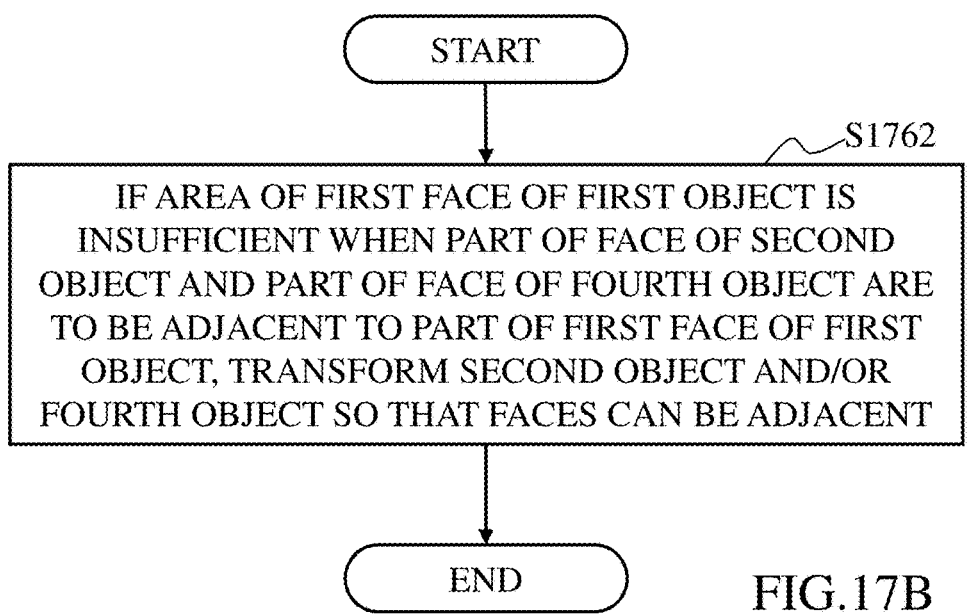

FIGS. 17A and 17B are diagrams showing another example of transforming objects in response to a change in content hierarchical relationship.

In FIG. 17A, an object 1730A and an object 1740A are adjacent on a top face 1712 of an object 1710, expressing a hierarchical relationship. It is assumed that, in this state, the user further wants to place an object 1750A on the top face 1712 of the object 1710. In this case, there is no more space available on the top face 1712 to place the object 1750A.

Therefore, the object 1730A, the object 1740A, and the object 1750A are reduced to become an object 1730B, an object 1740B, and an object 1750B.

This processing makes it possible to place the object 1730B, the object 1740B, and the object 1750B on the top face 1712 of the object 1710.

By thus transforming the object 1730A, the object 1740A, and the object 1750A into the object 1730B, the object 1740B, and the object 1750B, respectively, in this manner, the objects can be arranged in the virtual space without causing the user to experience a feeling of strangeness even when the hierarchical relationship changes.

The processing flow of FIG. 17B will be described below.

[Step S1762] If the area of a first face of a first object is insufficient when a part of a face of a second object and a part of a face of a fourth object are to be adjacent to a part of the first face of the first object, the second object and/or the fourth object are/is transformed so that the faces can be adjacent.

The processing of this step is as described in FIG. 17A.

Figure 18A:
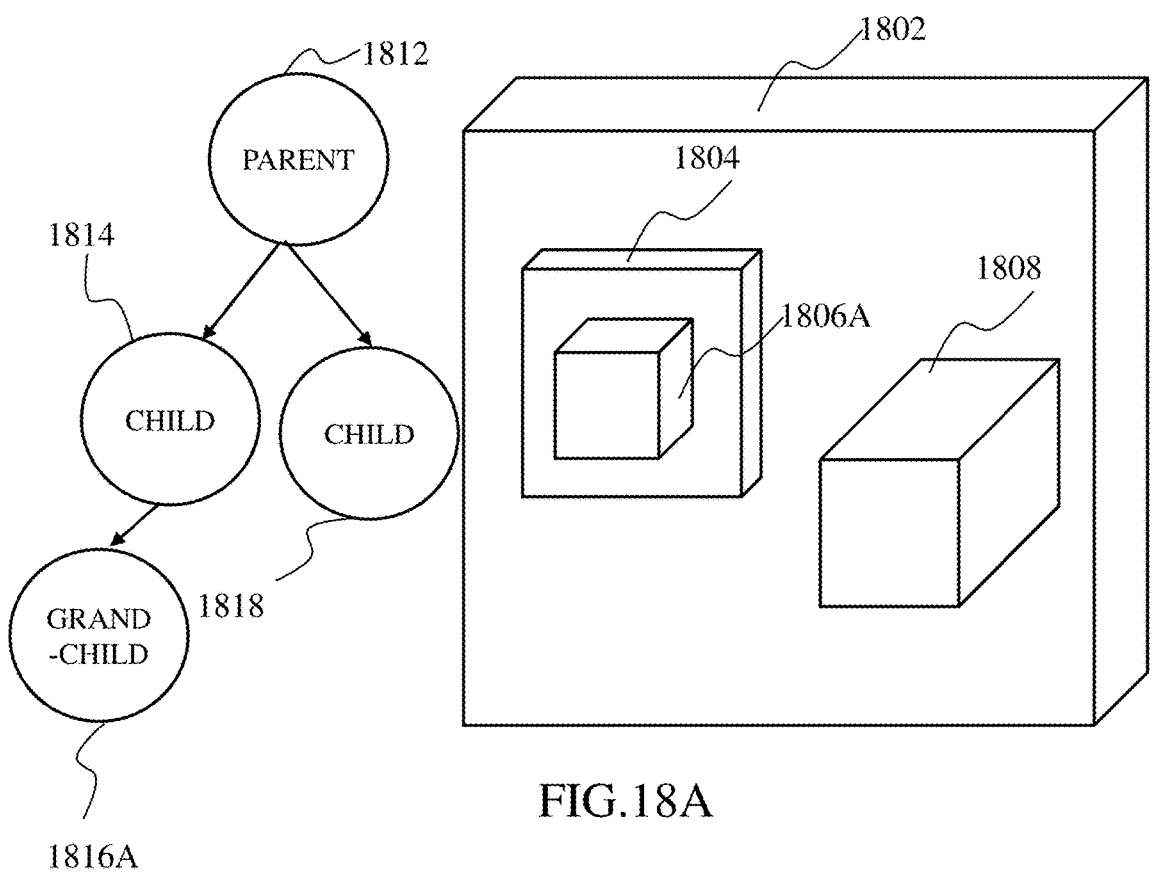
FIGS. 18A and 18B are diagrams showing an example of changing the content hierarchical relationship to reflect a change in position of an object.
Figure 18B:
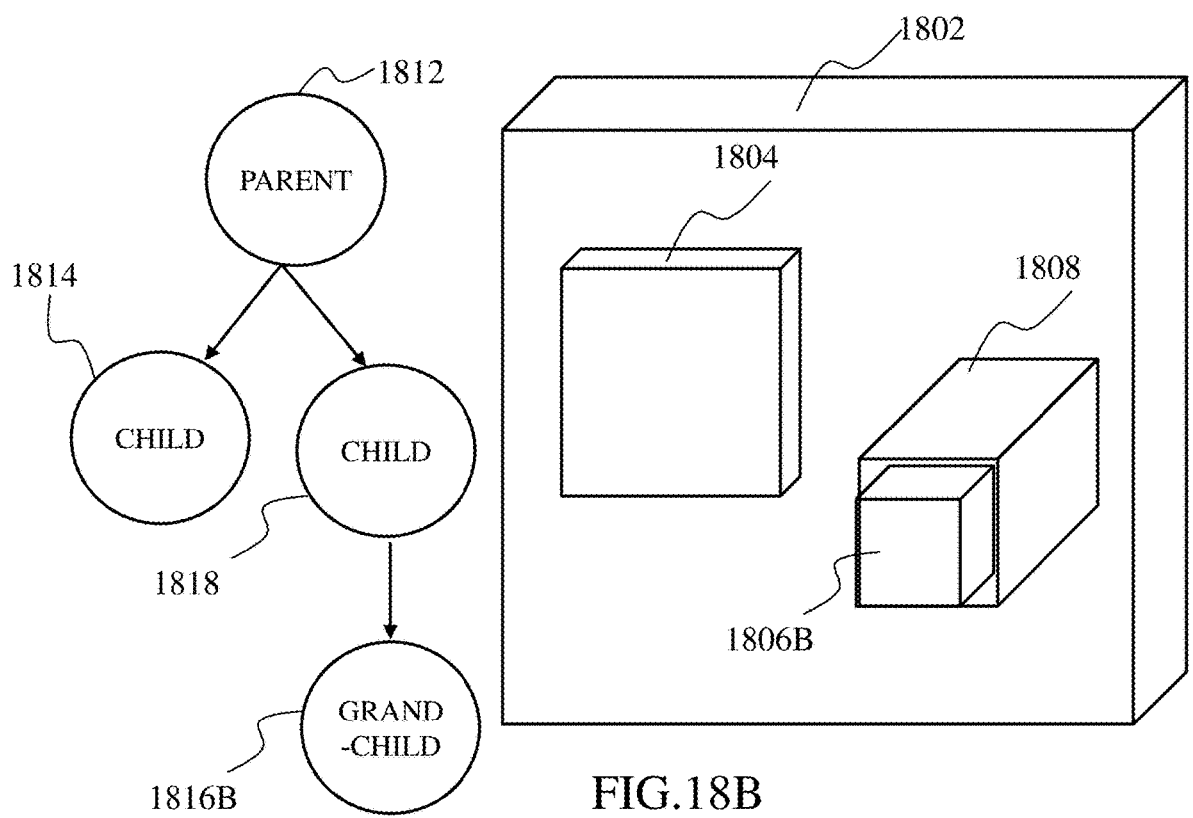

FIGS. 18A and 18B are diagrams showing an example of changing the content hierarchical relationship to reflect a change in position of an object.

As shown in FIG. 18A, there is an object 1806A as a child of an object 1804. An object 1808 has no child object. This positional relationship between the objects indicates that a content piece 1814 has a child content piece 1816A and a content piece 1818 has no child content piece.

As shown in FIG. 18B, it is assumed that the object 1806A is placed on a top face of the object 1808 to turn into an object 1806B.

In this case, a content piece 1816B comes to exist as a child of the content piece 1818. The content piece 1814 ceases to have the child content piece.

As described above, the user can intuitively move objects in a virtual space to reflect the positional relationship between the objects in the virtual space onto the content hierarchical relationship.

Figure 19:
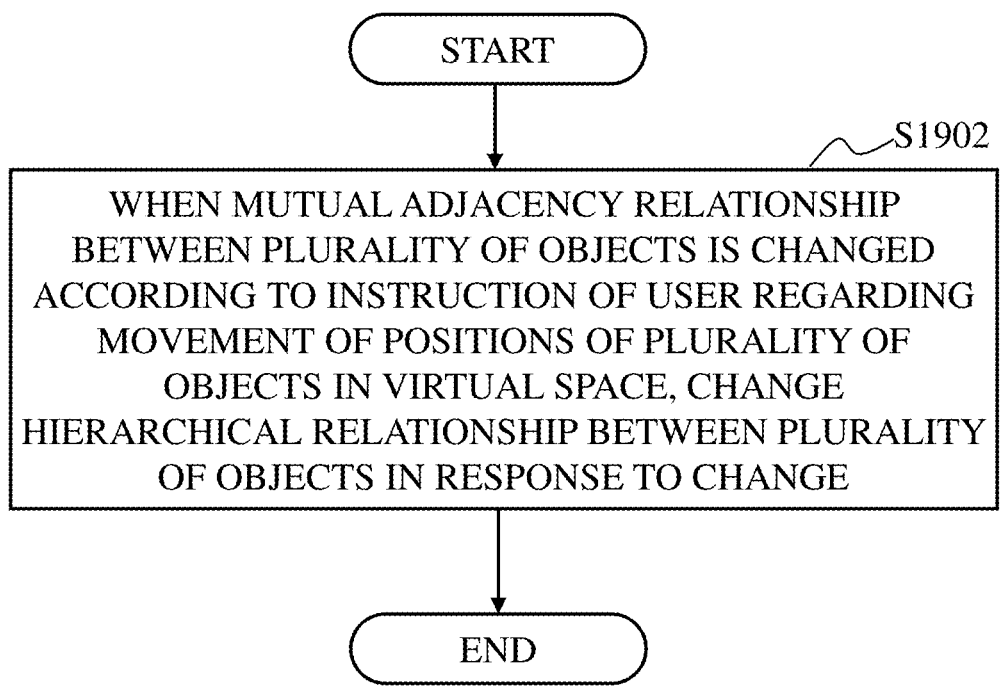
FIG. 19 is a diagram showing an example of changing the content hierarchical relationship to reflect a change in position of an object.

FIG. 19 is a diagram showing an example of changing a content hierarchical relationship to reflect a change in position of an object.

[Step S1902] When a mutual adjacency relationship between a plurality of objects is changed according to an instruction of a user regarding the movement of the positions of the plurality of objects in a virtual space, the hierarchical relationship is changed in response to the change.

This processing is as described in FIGS. 18A and 18B.

Figure 20:
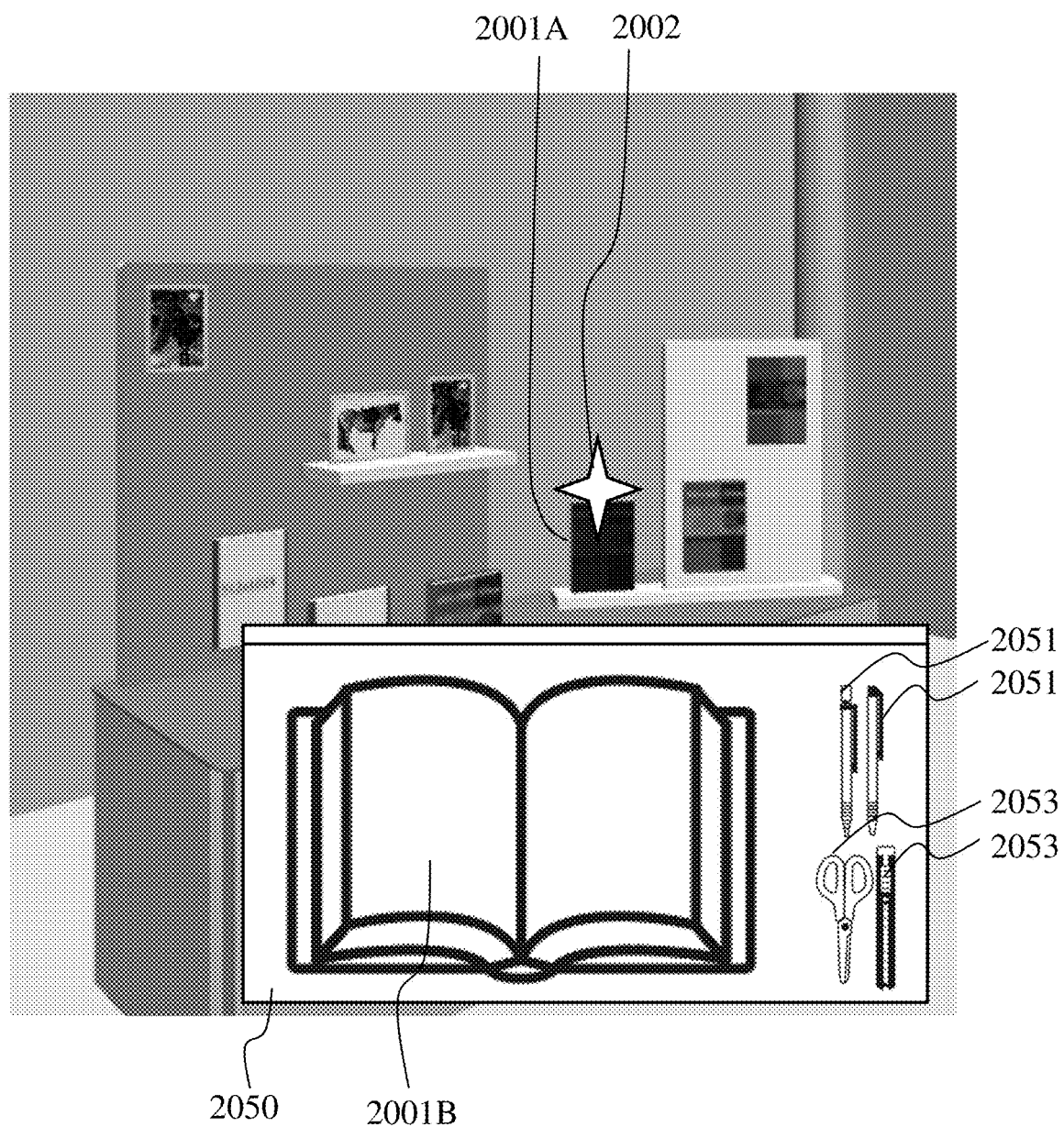
FIG. 20 is a diagram showing an example of applying a visual effect to an object selected by a user.

FIG. 20 is a diagram showing an example of applying a visual effect to an object selected by a user.

It is assumed that the user points to or selects a book object 2001A. In this case, a star mark 2002, for example, may be displayed near the object 2001A to indicate that the object 2001A has been selected.

Then, if it is determined that the user possesses a content piece of the object 2001A and has the right to refer to its real data, the player function may be operated to display a book view window 2050, for example. The book view window 2050 may display a book content piece 2001B, based on the real data of the content piece corresponding to the object 2001A. When the user has the right to edit the content piece 2001B, editing of the book is permitted by using a pen 2051 or a stationery tool 2053 for cutting paper displayed in the window 2050.

Figure 21:
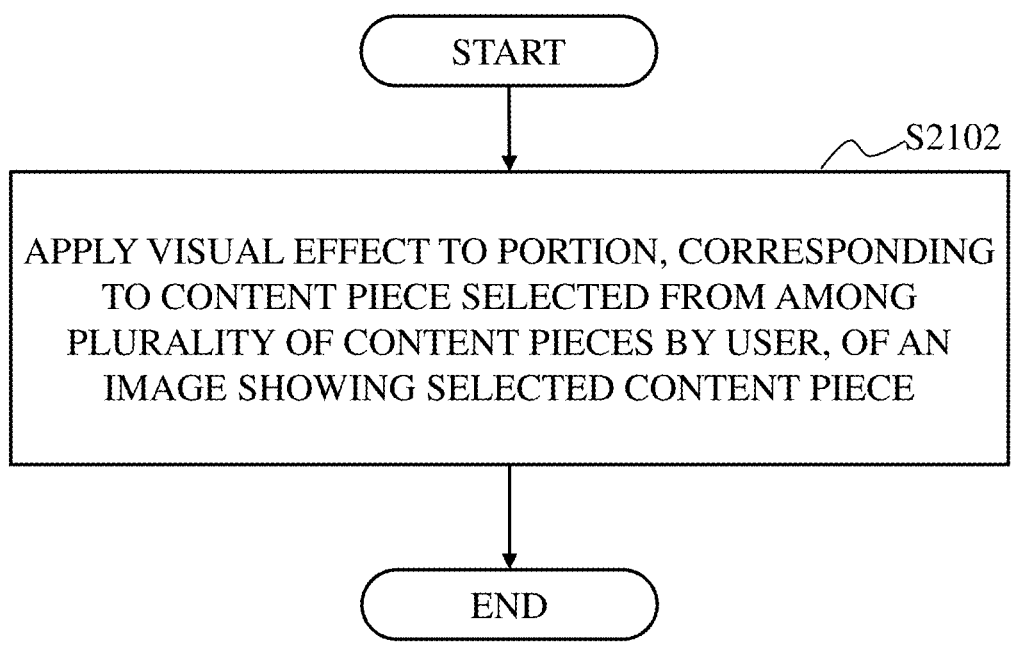
FIG. 21 is a diagram showing processing of applying a visual effect to an object selected by a user.

FIG. 21 is a diagram showing processing of applying a visual effect to an object selected by a user.

[Step S2102] A visual effect is applied to a portion of an image showing a content piece selected by the user from among a plurality of content pieces, the portion corresponding to the selected content piece.

This processing has been described above with reference to FIG. 20.

Figure 22:
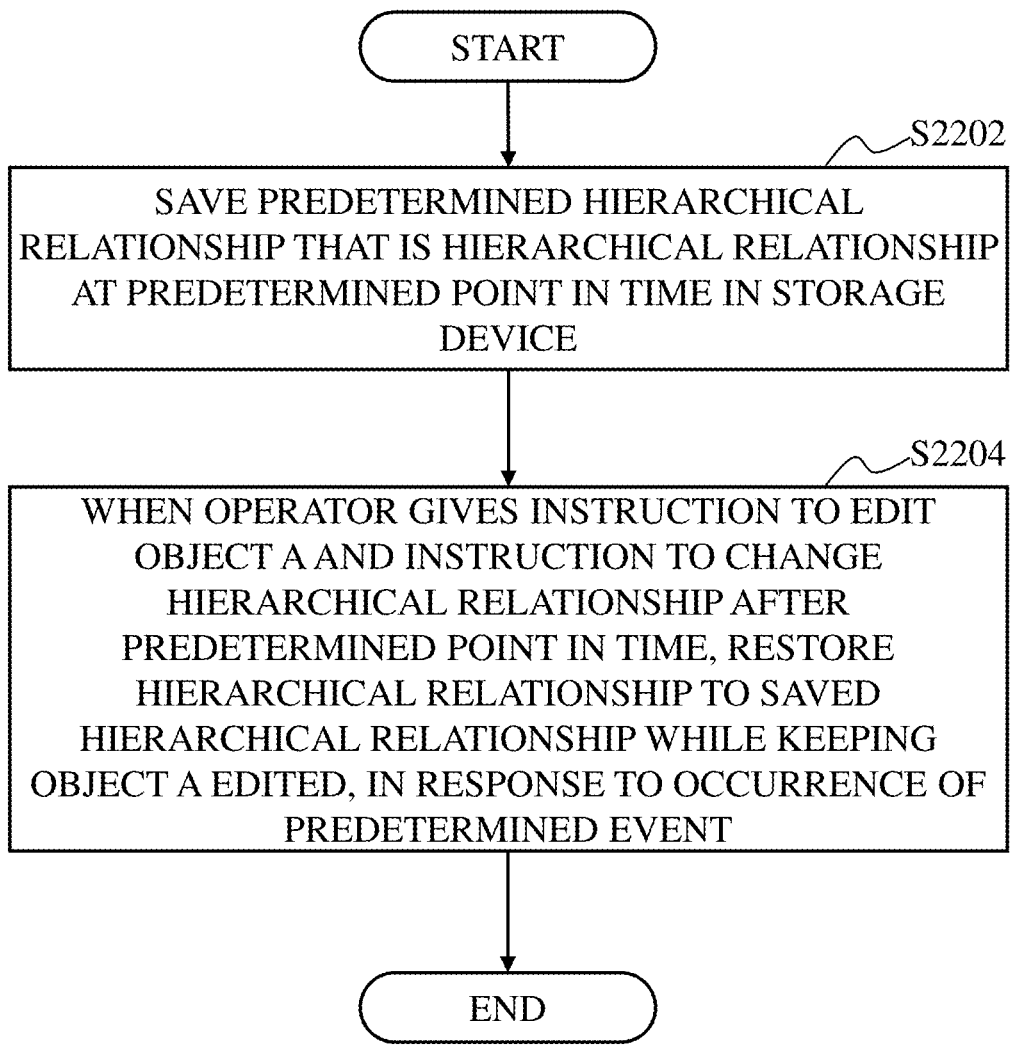
FIG. 22 is a diagram showing processing of returning the content hierarchical relationship to a state at a specified point in the past while keeping editing contents applied.

FIG. 22 is a diagram showing processing of returning the content hierarchical relationship to a state at a specified point in the past while keeping editing contents applied.

[Step S2202] A predetermined hierarchical relationship that is a hierarchical relationship at a predetermined point in time is saved in a storage device.

[Step S2204] When an operator gives an instruction to edit an object A and an instruction to change the hierarchical relationship after the predetermined point in time, the hierarchical relationship is restored to the saved hierarchical relationship while keeping the object A edited, in response to the occurrence of a predetermined event.

Such processing allows the user to restore the positional relationship between objects in a virtual space to its state in the past. In this case, it is preferable that the editing information is not restored to its state in the past, but is retained as it is in the applied state.

It is assumed, for example, that the user gathers objects required for a predetermined task on a desk object to perform the task in a virtual space.

The task is assumed to include editing a content piece.

It is assumed that, upon completion of the task, the user wishes to save the editing information that is the result of the task. It is also assumed that the user wishes to return the objects gathered on the desk for the task to their original locations.

The processing of FIG. 22 is to fulfill his/her wishes. By implementing such processing, the user's work efficiency can be dramatically improved.

Figure 23:
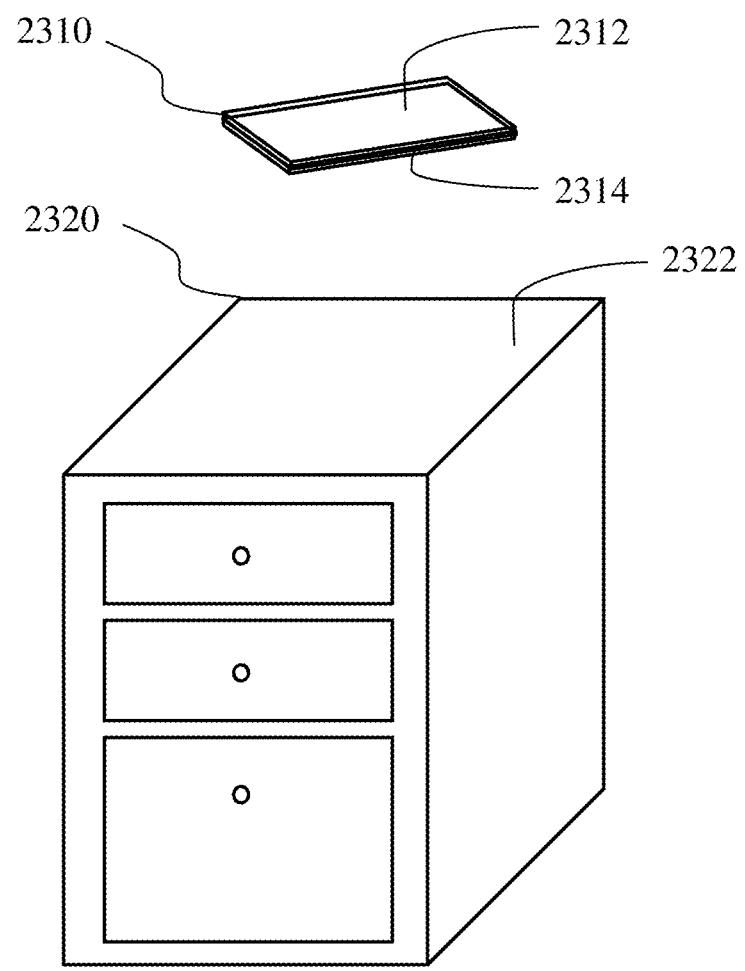
FIG. 23 is a diagram showing an example of applying predetermined rules regarding the adjacency of faces between objects.

FIG. 23 is a diagram showing an example of applying predetermined rules regarding the adjacency of faces between objects.

It is assumed that any one of the faces of a notepad object 2310 is placed adjacent to a chest object 2320.

It can be preset that a child object of the chest 2320 is always adjacent to a face 2322.

It can also be preset that one of a larger face 2312 and a face 2314 of the notepad 2310 is adjacent to a face of a parent object or child object.

In this case, when the user places the notepad 2310 on the chest 2320, the face 2322 can be adjacent to the face 2314, or the face 2322 can be adjacent to the face 2312.

This can prevent the objects from being unnaturally adjacent to each other, thus improving convenience for the user.

Figure 24A:
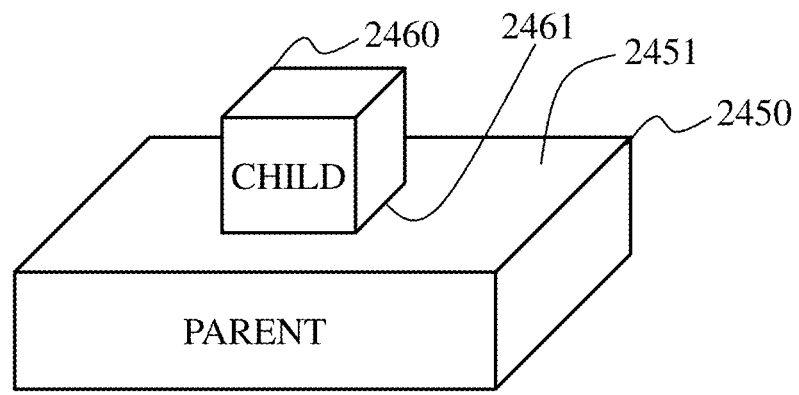
FIG. 24A is a diagram showing Rule A for the adjacency of objects when parent and child objects are positioned one above the other.
Figure 24B:
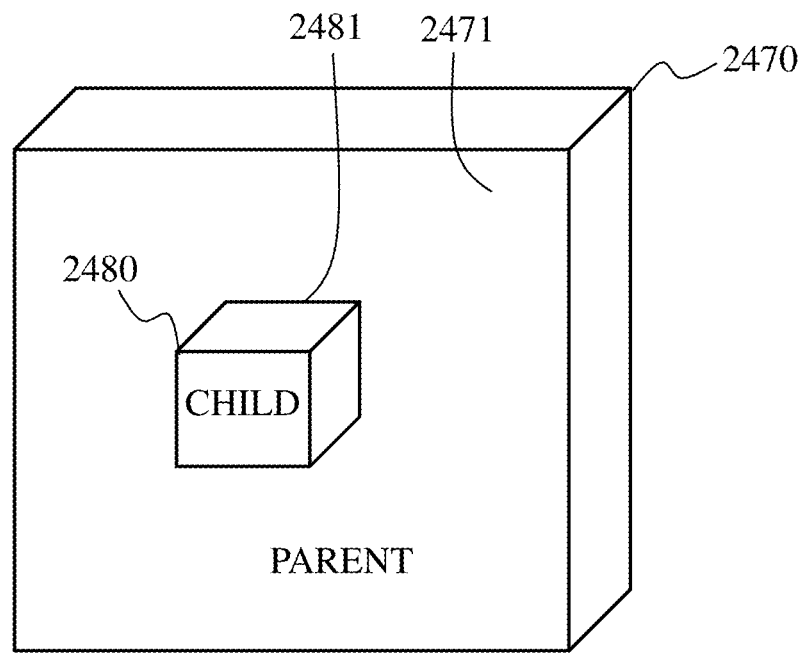
FIG. 24B is a diagram showing Rule B for the adjacency of objects when parent and child objects are positioned one behind the other.

FIGS. 24A and 24B are diagrams showing examples of a plurality of rules regarding the adjacency of objects.

FIG. 24A is a diagram showing Rule A for the adjacency of objects when parent and child objects are positioned one above the other.

A top face 2451 of a parent object 2450 is adjacent to a bottom face 2461 of a child object 2460. The rule that allows objects to be thus adjacent one above the other is called Rule A.

FIG. 24B is a diagram showing Rule B for the adjacency of objects when parent and child objects are positioned one behind the other.

A front face 2471 of a parent object 2470 is adjacent to a back face 2481 of a child object 2480. The rule that allows objects to be thus adjacent one behind the other is called Rule B.

Such adjacency rules may be stored in the central DB 151, or may be stored in content management information. The adjacency rules set for objects may be changed as appropriate by the user, for example, using a tool such as Explorer.

When objects are adjacent to each other, the adjacency rule for the object representing a parent content piece, for example, may be preferentially applied. In this case, the adjacency rule defined for the child object may be changed to the adjacency rule defined for the parent object to allow the objects to be adjacent to each other.

For example, when the parent object is rotated so that the top face of the parent object faces forward, Rule A may be changed to Rule B to change the adjacency relationship for objects such as descendants adjacent to the parent.

The adjacency rule may be set only for the object representing a folder. In this case, it is preferable that the adjacency rule applied to the object representing a content piece is automatically determined by the adjacency rule set for the folder to which the content piece belongs. For example, the same adjacency rule as that set for the folder to which the content piece belongs may be applied to the object representing the content piece.

The shape of the object may be changed depending on the adjacency rule set for the object representing the folder. For example, an object representing a folder for which Rule A is set may have a shelf shape, while an object representing a folder for which Rule B is set may have a wall shape.

Furthermore, the shape of an object representing a folder X may be changed depending on a combination of the adjacency rule set for the object representing the folder X and the adjacency rule set for an object representing a parent folder Y of the folder X.

This makes it possible to place a plurality of objects, which are in a natural adjacency relationship, in a virtual three-dimensional space, compared to the adjacency relationship between objects in the real world.

Figure 25:
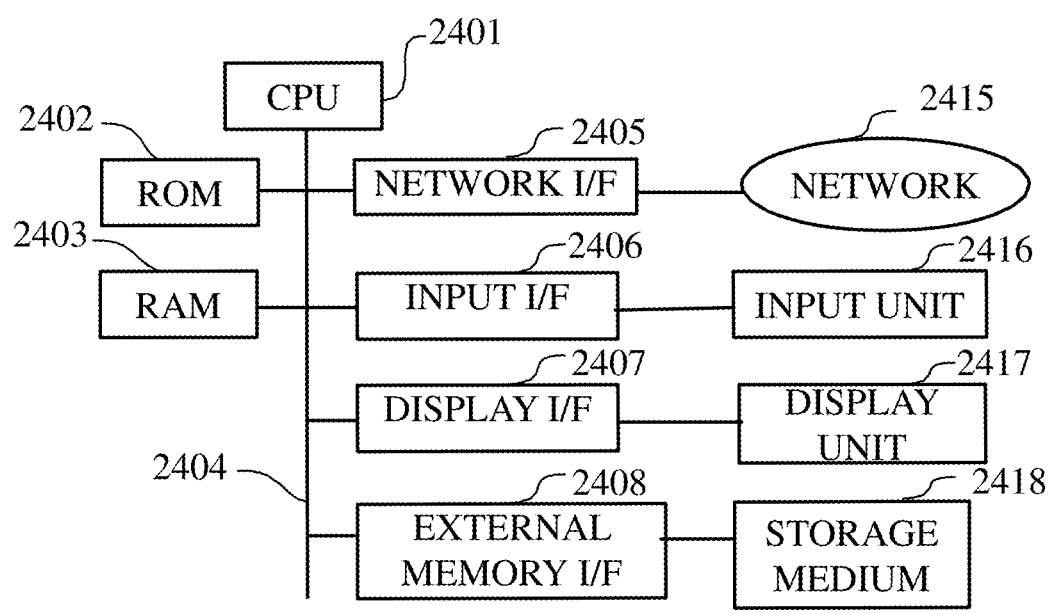
FIG. 25 is a hardware configuration diagram of the embodiment described above.

FIG. 25 is a hardware configuration diagram of the above embodiment.

A hardware configuration of the embodiment includes a CPU 2401, a ROM 2402 in which the program and data of this embodiment can be stored, a RAM 2403, a network interface 2405, an input interface 2406, a display interface 2407, and an external memory interface 2408. These hardware components are connected to each other through a bus 2404.

The network interface 2405 is connected to a network 2415. The network 2415 may be a wired LAN, a wireless LAN, the Internet, a telephone network or the like. The input interface 2406 is connected to an input unit 2416. The display interface 2407 is connected to a display unit 2417. The display unit 2417 may be realized by a plurality of display devices. The external memory interface 2408 is connected to a storage medium 2418. The storage medium 2418 may be a RAM, a ROM, a CD-ROM, a DVD-ROM, a hard disk, a memory card, a USB memory or the like.

The order of each flow in the illustrated flowchart can be changed as long as there is no contradiction. Moreover, as long as there is no contradiction, one illustrated flow can be executed more than once at different times. Furthermore, as long as there is no contradiction, a plurality of flows can be executed simultaneously. Not all steps are essential, and as long as there is no contradiction, some of the steps may not exist or do not have to be executed. Furthermore, each step may be executed by an operating system or hardware. The program can also be distributed in a state of being stored in a non-transitory medium.

The program and method for realizing the embodiments described above may be executed by a computer having the hardware configuration shown in FIG. 7. That is, the program of the embodiment may be implemented as a method for causing the computer to execute the program.

The program may be stored in the storage medium 2418, the ROM 2402 or the RAM 2403.

Each embodiment may be implemented as a hardware device with the program installed.

The following appendices are provided regarding the above disclosed embodiments.

APPENDIX 1

A content display method for instructing a display device to express a hierarchical relationship between a plurality of content pieces and a plurality of folders, for which prepared are a virtual space in which arranged are the plurality of content pieces that may have a hierarchical relationship with each other and are possessed by a user and a plurality of objects representing each of the plurality of folders that may have the content pieces at a lower level in the hierarchical relationship, and a virtual camera that captures and generates an image of the virtual space, the method including:

when a first object, a second object, and a third object have a hierarchical relationship between a parent, a child, and a grandchild, arranging the first object, the second object, and the third object in the virtual space so that a part of a first face of the first object is adjacent to a part of a second face of the second object, and a part of a third face of the second object is adjacent to a part of a face of the third object;

when the first object and a fourth object have a hierarchical relationship between a parent and a child, arranging the first object and the fourth object in the virtual space so that a part of the first face of the first object is adjacent to a part of a face of the fourth object;

instructing the display device to display the image of the virtual space captured by the virtual camera according to an instruction of the user to the virtual camera.

APPENDIX 2

The content display method according to appendix 1, in which
the face is either a plane of a solid that approximates an inner shape of the object or a plane of a solid that approximates an outer shape of the object, or both.

APPENDIX 3

The content display method according to appendix 1, further including:
if there is a predetermined object and an object subordinate to the predetermined object among the plurality of objects, determining respective positions of the plurality of objects in the virtual space so that, upon instruction of an operator to move the predetermined object in the virtual space, the predetermined object and the object subordinate thereto move in the virtual space while maintaining their mutual adjacency.

APPENDIX 4

The content display method according to appendix 1, in which
when the plurality of content pieces include a content piece A and a content piece B, a hierarchical relationship is permitted in which the parent content piece A has the child content piece B, and there is no folder between the content piece A and the content piece B.

APPENDIX 5

The content display method according to Appendix 1, further including:
if the first face does not have enough area when a part of a face of the second object and a part of a face of the fourth object are to be adjacent to a part of the first face of the first object, transforming the first object so that the faces can be adjacent.

APPENDIX 6

The content display method according to Appendix 1, in which,
if the first face does not have enough area when a part of a face of the second object and a part of a face of the fourth object are to be adjacent to a part of the first face of the first object, transforming the second object and/or the fourth object so that the faces can be adjacent.

APPENDIX 7

The content display method according to appendix 1, further including:
when a mutual adjacency relationship between the plurality of objects is changed according to an instruction of the user regarding the movement of the positions of the plurality of objects in the virtual space, changing the hierarchical relationship in response to the change.

APPENDIX 8

The content display method according to appendix 1, further including:
applying a visual effect to a portion of the image showing a content piece selected by the user from among the plurality of content pieces, the portion corresponding to the selected content piece.

APPENDIX 9

The content display method according to appendix 1, further including:
saving a predetermined hierarchical relationship, which is the hierarchical relationship at a predetermined point in time, in a storage device; and
upon instructions of an operator to edit an object A and to change the hierarchical relationship after the predetermined point in time, restoring the hierarchical relationship to the saved predetermined hierarchical relationship while keeping the object A edited.

APPENDIX 10

The content display method according to Appendix 1, in which,
when one object and the other object have a parent-child relationship, the predetermined face X of the one object and the predetermined face Y of the other object are preset so that a part of predetermined face X is adjacent to a part of the predetermined face Y.

APPENDIX 11

The content display method according to Appendix 10, in which,
if there are a plurality of the predetermined faces X and a plurality of the predetermined faces Y,
a part of one of the plurality of predetermined faces X is adjacent to a part of one of the plurality of predetermined faces Y according to an instruction of the user.

APPENDIX 12

A program for causing a computer to execute the method according to any one of appendices 1 to 11.

While several embodiments of the invention were described in the foregoing detailed description, those skilled in the art make modifications and alterations to these embodiments without departing from the scope and spirit of the invention. Accordingly, the foregoing description is intended to be illustrative rather than restrictive.

The invention claimed is:
1. A content display method for instructing a display device to express a hierarchical relationship between a plurality of content pieces and a plurality of folders, for which prepared are a virtual space in which arranged are the plurality of content pieces that may have a hierarchical relationship with each other and are possessed by a user and a plurality of objects representing each of the plurality of folders that may have the content pieces at a lower level in the hierarchical relationship, and a virtual camera that captures and generates an image of the virtual space,
the method comprising:
when a first object, a second object, and a third object have a hierarchical relationship between a parent, a child, and a grandchild, arranging the first object, the second object, and the third object in the virtual space so that a part of a first face of the first object is adjacent to a part of a second face of the second object, and a part of a third face of the second object is adjacent to a part of a face of the third object;

when the first object and a fourth object have a hierarchical relationship between a parent and a child, arranging the first object and the fourth object in the virtual space so that a part of the first face of the first object is adjacent to a part of a face of the fourth object;

instructing the display device to display the image of the virtual space captured by the virtual camera according to an instruction of the user to the virtual camera; and when a first adjacency in which a part of the face of the second object is adjacent to a part of the first face of the first object has already been achieved, and a second adjacency in which a part of the face of the fourth object is further adjacent to a part of the first face is to be achieved, if the second adjacency cannot be achieved because the first face does not have enough area, transforming the first object so that the second adjacency can be achieved by enlarging the first face.

2. The content display method according to claim 1, wherein
the face is either a plane of a solid that approximates an inner shape of the object or a plane of a solid that approximates an outer shape of the object, or both.

3. The content display method according to claim 1, further comprising:
if there is a predetermined object and an object subordinate to the predetermined object among the plurality of objects, determining respective positions of the plurality of objects in the virtual space so that, upon instruction of an operator to move the predetermined object in the virtual space, the predetermined object and the object subordinate thereto move in the virtual space while maintaining their mutual adjacency.

4. The content display method according to claim 1 wherein
when the plurality of content pieces include a content piece A and a content piece B, a hierarchical relationship is permitted in which the parent content piece A has the child content piece B, and there is no folder between the content piece A and the content piece B.

5. The content display method according to claim 1, further comprising:
when a mutual adjacency relationship between the plurality of objects is changed according to an instruction of the user regarding the movement of the positions of the plurality of objects in the virtual space, changing the hierarchical relationship in response to the change.

6. The content display method according to claim 1, further comprising:
applying a visual effect to a portion of the image showing a content piece selected by the user from among the plurality of content pieces, the portion corresponding to the selected content piece.

7. A non-transitory computer-readable medium storing a program for causing a computer to execute the method according to claim 1.

8. A content display method for instructing a display device to express a hierarchical relationship between a plurality of content pieces and a plurality of folders, for which prepared are a virtual space in which arranged are the plurality of content pieces that may have a hierarchical relationship with each other and are possessed by a user and a plurality of objects representing each of the plurality of folders that may have the content pieces at a lower level in the hierarchical relationship, and a virtual camera that captures and generates an image of the virtual space, the method comprising:
when a first object, a second object, and a third object have a hierarchical relationship between a parent, a child, and a grandchild, arranging the first object, the second object, and the third object in the virtual space so that a part of a first face of the first object is adjacent to a part of a second face of the second object, and a part of a third face of the second object is adjacent to a part of a face of the third object;

when the first object and a fourth object have a hierarchical relationship between a parent and a child, arranging the first object and the fourth object in the virtual space so that a part of the first face of the first object is adjacent to a part of a face of the fourth object;

instructing the display device to display the image of the virtual space captured by the virtual camera according to an instruction of the user to the virtual camera; and when a first adjacency in which a part of the face of the second object is adjacent to a part of the first face of the first object has already been achieved, and a second adjacency in which a part of the face of the fourth object is further adjacent to a part of the first face is to be achieved, if the second adjacency cannot be achieved because the first face does not have enough area, transforming the second object and/or the fourth object so that the second adjacency can be achieved by reducing the face of the second object and/or the face of the fourth object.

9. The content display method according to claim 8, wherein
the face is either a plane of a solid that approximates an inner shape of the object or a plane of a solid that approximates an outer shape of the object, or both.

10. The content display method according to claim 8, further comprising:
if there is a predetermined object and an object subordinate to the predetermined object among the plurality of objects, determining respective positions of the plurality of objects in the virtual space so that, upon instruction of an operator to move the predetermined object in the virtual space, the predetermined object and the object subordinate thereto move in the virtual space while maintaining their mutual adjacency.

11. The content display method according to claim 8 wherein
when the plurality of content pieces include a content piece A and a content piece B, a hierarchical relationship is permitted in which the parent content piece A has the child content piece B, and there is no folder between the content piece A and the content piece B.

12. A content display method for instructing a display device to express a hierarchical relationship between a plurality of content pieces and a plurality of folders, for which prepared are a virtual space in which arranged are the plurality of content pieces that may have a hierarchical relationship with each other and are possessed by a user and a plurality of objects representing each of the plurality of folders that may have the content pieces at a lower level in the hierarchical relationship, and a virtual camera that captures and generates an image of the virtual space, the method comprising:
when a first object, a second object, and a third object have a hierarchical relationship between a parent, a child, and a grandchild, arranging the first object, the second object, and the third object in the virtual space so that a part of a first face of the first object is adjacent to a part of a second face of the second object, and a part of a third face of the second object is adjacent to a part of a face of the third object;

when the first object and a fourth object have a hierarchical relationship between a parent and a child, arranging the first object and the fourth object in the virtual space so that a part of the first face of the first object is adjacent to a part of a face of the fourth object;

instructing the display device to display the image of the virtual space captured by the virtual camera according to an instruction of the user to the virtual camera;

saving a predetermined hierarchical relationship, which is the hierarchical relationship at a predetermined point in time, in a storage device; and upon instructions of an operator to edit an object A and to change the hierarchical relationship after the predetermined point in time, restoring the hierarchical relationship to the saved predetermined hierarchical relationship while keeping the object A edited.

13. The content display method according to claim 12, wherein the face is either a plane of a solid that approximates an inner shape of the object or a plane of a solid that approximates an outer shape of the object, or both.

14. The content display method according to claim 12, further comprising:

if there is a predetermined object and an object subordinate to the predetermined object among the plurality of objects, determining respective positions of the plurality of objects in the virtual space so that, upon instruction of an operator to move the predetermined object in the virtual space, the predetermined object and the object subordinate thereto move in the virtual space while maintaining their mutual adjacency.

15. The content display method according to claim 12 wherein when the plurality of content pieces include a content piece A and a content piece B, a hierarchical relationship is permitted in which the parent content piece A has the child content piece B, and there is no folder between the content piece A and the content piece B.

16. A content display method for instructing a display device to express a hierarchical relationship between a plurality of content pieces and a plurality of folders, for which prepared are a virtual space in which arranged are the plurality of content pieces that may have a hierarchical relationship with each other and are possessed by a user and a plurality of objects representing each of the plurality of folders that may have the content pieces at a lower level in the hierarchical relationship, and a virtual camera that captures and generates an image of the virtual space, the method comprising:

when a first object, a second object, and a third object have a hierarchical relationship between a parent, a child, and a grandchild, arranging the first object, the second object, and the third object in the virtual space so that a part of a first face of the first object is adjacent to a part of a second face of the second object, and a part of a third face of the second object is adjacent to a part of a face of the third object;

when the first object and a fourth object have a hierarchical relationship between a parent and a child, arranging the first object and the fourth object in the virtual space so that a part of the first face of the first object is adjacent to a part of a face of the fourth object; and instructing the display device to display the image of the virtual space captured by the virtual camera according to an instruction of the user to the virtual camera, wherein when one object and the other object have a parent-child relationship, a plurality of combination rules are predetermined for a predetermined face X of the one object and a predetermined face Y of the other object when the predetermined face X and the predetermined face Y are adjacent to each other, so that a part of the face X is adjacent to a part of the face Y, and one of the plurality of combination rules is selected depending on whether the one object and the other object are adjacent one above the other or one behind the other.

17. The content display method according to claim 16, wherein, in any of the plurality of combination rules, if there are a plurality of the predetermined faces X or the predetermined faces Y, a part of one of the plurality of predetermined faces X or a part of one of the plurality of predetermined faces Y is specified according to an instruction of the user.

18. The content display method according to claim 16, wherein the face is either a plane of a solid that approximates an inner shape of the object or a plane of a solid that approximates an outer shape of the object, or both.

19. The content display method according to claim 16, further comprising:

if there is a predetermined object and an object subordinate to the predetermined object among the plurality of objects, determining respective positions of the plurality of objects in the virtual space so that, upon instruction of an operator to move the predetermined object in the virtual space, the predetermined object and the object subordinate thereto move in the virtual space while maintaining their mutual adjacency.

20. The content display method according to claim 16 wherein when the plurality of content pieces include a content piece A and a content piece B, a hierarchical relationship is permitted in which the parent content piece A has the child content piece B, and there is no folder between the content piece A and the content piece B.

* * * * *